US012475006B2

United States Patent
Egan et al.

(10) Patent No.: US 12,475,006 B2
(45) Date of Patent: Nov. 18, 2025

(54) COST REDUCED HIGH RELIABILITY FAULT TOLERANT COMPUTER ARCHITECTURE

(71) Applicant: STRATUS TECHNOLOGIES IRELAND LTD., Dublin (IE)

(72) Inventors: Michael Egan, Groton, MA (US); Beverly Brown, Westford, MA (US); Lei Cao, Westford, MA (US); Steven Haid, Bolton, MA (US); Charles Horvath, Jamaica Plain, MA (US); John MacLeod, Cambridge, MA (US)

(73) Assignee: STRATUS TECHNOLOGIES IRELAND LTD., Dublin (IE)

( * ) Notice: Subject to any disclaimer, the term of this patent is extended or adjusted under 35 U.S.C. 154(b) by 0 days.

(21) Appl. No.: 18/399,469

(22) Filed: Dec. 28, 2023

(65) Prior Publication Data
US 2025/0130721 A1    Apr. 24, 2025

Related U.S. Application Data

(60) Provisional application No. 63/545,153, filed on Oct. 20, 2023.

(51) Int. Cl.
*G06F 11/20* (2006.01)

(52) U.S. Cl.
CPC ........ *G06F 11/203* (2013.01); *G06F 11/2023* (2013.01); *G06F 11/2038* (2013.01); *G06F 11/2048* (2013.01)

(58) Field of Classification Search
CPC ............ G06F 11/2002; G06F 11/1658; G06F 11/2038; G06F 3/0619; G06F 3/061; G06F 3/0647; G06F 3/0679
See application file for complete search history.

(56) References Cited

U.S. PATENT DOCUMENTS 6,355,991 B1    3/2002 Goff et al.
6,633,996 B1    10/2003 Suffin et al.
(Continued)

FOREIGN PATENT DOCUMENTS

WO    2022/007644 A1    1/2022

OTHER PUBLICATIONS

Dong et al., "COLO: COarse-grain LOck-stepping Virtual Machine for Non-stop Service", SoCC'13, Oct. 1-3, 2013, Santa Clara, California, USA, ACM 978-1-4503-2428-1; 16 pages.
(Continued)

*Primary Examiner* — Edward J Dudek, Jr.
(74) *Attorney, Agent, or Firm* — K&L GATES LLP

(57) ABSTRACT

In part, in one aspect, the disclosure relates to a first computer system including a first processor and first memory, a first IO storage subsystem including a first switch configured for one or more first storage devices, a first IO non-storage subsystem including a first which configured for one or more first non-storage devices, a second compute system including a second processor and second memory, a second storage IO subsystem including a second switch configured for one or more second storage devices, a second IO non-storage subsystem including a second switch configured for one or more second non-storage devices and a midplane including a power connector, a processor side and an IO side, wherein the processing side includes connectors in electrical communication with the computer systems, the IO side includes connectors in electrical communication with the storage and non-storage subsystems.

16 Claims, 15 Drawing Sheets

(56) References Cited

U.S. PATENT DOCUMENTS

| | | |
|---|---|---|
| 6,687,851 B1 | 2/2004 | Somers et al. |
| 6,691,225 B1 | 2/2004 | Suffin |
| 6,691,257 B1 | 2/2004 | Suffin |
| 6,708,283 B1 | 3/2004 | Nevin et al. |
| 6,718,474 B1 | 4/2004 | Somers et al. |
| 6,766,413 B2 | 7/2004 | Newman |
| 6,766,479 B2 | 7/2004 | Edwards |
| 6,802,022 B1 | 10/2004 | Olson |
| 6,813,721 B1 | 11/2004 | Tetreault et al. |
| 6,842,823 B1 | 1/2005 | Olson |
| 6,862,689 B2 | 3/2005 | Bergsten et al. |
| 6,874,102 B2 | 3/2005 | Doody et al. |
| 6,886,171 B2 | 4/2005 | MacLeod |
| 6,928,583 B2 | 8/2005 | Griffin et al. |
| 6,948,010 B2 | 9/2005 | Somers et al. |
| 6,970,892 B2 | 11/2005 | Green et al. |
| 6,971,043 B2 | 11/2005 | McLoughlin et al. |
| 6,996,750 B2 | 2/2006 | Tetreault |
| 7,065,672 B2 | 6/2006 | Long et al. |
| 7,496,786 B2 | 2/2009 | Graham et al. |
| 7,496,787 B2 | 2/2009 | Edwards et al. |
| 7,669,073 B2 | 2/2010 | Graham et al. |
| 7,904,906 B2 | 3/2011 | Puthukattukaran et al. |
| 7,958,076 B2 | 6/2011 | Bergsten et al. |
| 8,117,495 B2 | 2/2012 | Graham |
| 8,161,311 B2 | 4/2012 | Wiebe |
| 8,234,521 B2 | 7/2012 | Graham et al. |
| 8,271,416 B2 | 9/2012 | Al-Biek et al. |
| 8,312,318 B2 | 11/2012 | Graham et al. |
| 8,381,012 B2 | 2/2013 | Wiebe |
| 8,812,907 B1 | 8/2014 | Bissett et al. |
| 9,251,002 B2 | 2/2016 | Manchek et al. |
| 9,588,844 B2 | 3/2017 | Bissett et al. |
| 9,652,338 B2 | 5/2017 | Bissett et al. |
| 9,760,442 B2 | 9/2017 | Bissett et al. |
| 10,216,598 B2 | 2/2019 | Haid et al. |
| 10,360,117 B2 | 7/2019 | Haid et al. |
| 11,288,143 B2 | 3/2022 | Horvath et al. |
| 11,586,514 B2 | 2/2023 | Pawlowski et al. |
| 2001/0042202 A1 | 11/2001 | Horrath et al. |
| 2002/0016935 A1 | 2/2002 | Bergsten et al. |
| 2002/0070717 A1 | 6/2002 | Pellegrino |
| 2003/0046670 A1 | 3/2003 | Marlow |
| 2003/0095366 A1 | 5/2003 | Pellegrino |
| 2006/0222125 A1 | 10/2006 | Edwards et al. |
| 2006/0222126 A1 | 10/2006 | Edwards et al. |
| 2006/0259815 A1 | 11/2006 | Graham et al. |
| 2006/0274508 A1 | 12/2006 | LaRiviere et al. |
| 2007/0011499 A1 | 1/2007 | Begsten et al. |
| 2007/0028144 A1 | 2/2007 | Graham et al. |
| 2007/0038891 A1 | 2/2007 | Graham |
| 2007/0106873 A1 | 5/2007 | Lally et al. |
| 2007/0174484 A1 | 7/2007 | Lussier et al. |
| 2009/0249129 A1 | 10/2009 | Femia |
| 2010/0088440 A1 | 4/2010 | Banks et al. |
| 2013/0058351 A1 | 3/2013 | Casado et al. |
| 2014/0250320 A1* | 9/2014 | Nyuunoya .......... G06F 11/2028 714/4.11 |
| 2015/0205688 A1 | 7/2015 | Haid et al. |
| 2015/0254082 A1* | 9/2015 | Vishwanathan ...... G06F 9/4416 713/2 |
| 2015/0263983 A1 | 9/2015 | Brennan et al. |
| 2015/0370666 A1 | 12/2015 | Breakstone et al. |
| 2017/0324609 A1 | 11/2017 | Hong et al. |
| 2018/0046480 A1 | 2/2018 | Dong et al. |
| 2018/0143885 A1 | 5/2018 | Dong et al. |
| 2018/0322082 A1* | 11/2018 | Breakstone ................ G06T 1/20 |
| 2020/0050523 A1* | 2/2020 | Pawlowski .......... G06F 13/4022 |
| 2021/0034250 A1* | 2/2021 | Mizuno ................. G06F 3/0661 |
| 2021/0034447 A1 | 2/2021 | Horvath et al. |
| 2021/0034464 A1 | 2/2021 | Dailey et al. |
| 2021/0034465 A1 | 2/2021 | Haid et al. |
| 2021/0034483 A1 | 2/2021 | Haid |
| 2021/0034523 A1 | 2/2021 | Dailey |
| 2021/0037092 A1 | 2/2021 | Cao |
| 2022/0147428 A1* | 5/2022 | Gupta ................. G06F 11/1662 |
| 2023/0185681 A1 | 6/2023 | Pawlowski et al. |
| 2023/0291721 A1 | 9/2023 | Robinson |
| 2023/0393956 A1* | 12/2023 | Guim Bernat ...... G06F 11/0751 |
| 2024/0104251 A1* | 3/2024 | Paulraj ................. G06F 21/572 |
| 2024/0176739 A1 | 5/2024 | Alden et al. |

OTHER PUBLICATIONS

Dong et al., "COLO: COarse-grain LOck-stepping Virtual Machine for Non-stop Service", https://www.linux-kvm.org/images/1/1d/Kvm-forum-2013-COLO.pdf; 24 pages.

PCT International Search Report and PCT Written Opinion for PCT International Patent Application No. PCT/US2024/051799; mailing date Apr. 22, 2025; (20 pages).

PCT Invitation to Pay Additional Fees for PCT International Patent Application No. PCT/US2024/051799; mailing date Jan. 28, 2025; (12 pages).

* cited by examiner

COST REDUCED HIGH RELIABILITY FAULT TOLERANT COMPUTER ARCHITECTURE

CROSS REFERENCE TO RELATED APPLICATIONS

This application is a U.S. patent application which claims priority to and the benefit of U.S. Provisional Patent Application No. 63/545,153, filed on Oct. 20, 2023.

FIELD

This disclosure relates generally to the field of field of failover, redundancy, and fault tolerance in computing systems.

BACKGROUND

Contemporary computing systems with high availability requirements make use of resource redundancy and failover mechanisms for various purposes.

SUMMARY

In part, in one aspect, the disclosure relates to a Smart Exchange protocol, a method of transferring processor and memory state information as well as a PCI device hierarchy from a failing but active compute node to a standby compute node. In part, in one aspect, the active compute node and the failing compute node communicate via reading and writing to registers on an intermediate PCI switch, located on one of the IO domains. In part, in one aspect, the disclosure relates to a fault tolerant computer architecture comprising two compute nodes, two IO domains for storage devices, and two IO domains for non-storage devices.

In part, in one aspect, the disclosure relates to a fault tolerant computer system. The system includes a first computer system including a first processor and first memory, a first IO storage subsystem including a first N-lane switch configured for one or more first storage devices, a first IO non-storage subsystem including a first M-lane switch configured for one or more first non-storage devices, wherein M and N are whole numbers great than or equal to 2, a second compute system including a second processor and second memory, a second storage IO subsystem including a second N-lane switch configured for one or more second storage devices, a second IO non-storage subsystem including a second M-lane switch configured for one or more second non-storage devices and a midplane including a power connector, a processor side and an IO side, wherein the processing side includes one or more connectors in electrical communication with the first computer system and the second computer system, wherein the IO side includes a plurality of connectors in electrical communication with the first IO storage subsystem, the first IO non-storage subsystem, the second storage IO subsystem, and the second IO non-storage subsystem.

In one embodiment, the first computer system further includes a first operating system configured to run on the first processor, and the second computer system further includes a second operating system configured to run on the second processor. In one embodiment, each N-lane switch and M-lane switch are unmanaged such that no processor in electrical communication with the midplane is managing any of the N-lane switches and the M-lane switches. In one embodiment, the first computer system and the second computer system are both is in electrical communication with the first IO storage subsystem, the first IO non-storage subsystem, the second storage IO subsystem, and the second IO non-storage subsystem.

In some embodiments, the first operating system comprises a first platform driver, wherein the second operating system comprises a second platform driver, wherein each platform driver is a kernel mode driver. In one embodiment, the first platform driver and the second platform driver are each configured to establish a communication channel between the first computer system and the second computer system. In one embodiment, each computer system switch includes a set of readable and writeable registers, and each computer system is configured to modify registers of its respective switch to communicate information to the other computer system. In one embodiment, the information communicated by modifying registers includes messages for migrate operations, apply operations, and commit operations transmitted from the first compute node as well as acknowledgements of migrate operations, apply operations, and commit operations by the second compute node.

In some embodiments, each computer system switch comprises modified switch firmware. In one embodiment, the modified switch firmware is configured to, in response to an indication that the first computer system is failing, or about to fail, reprovision a group of devices in communication with the first computer system such that the group of devices becomes attached to and in communication with the second communication system.

In some embodiments, the first computer system includes a switch, wherein the switch is connected to the midplane, wherein the switch includes modified switch firmware, the modified switch firmware to generate a first synthetic device including a first set of registers. In one embodiment, each platform driver is configured to write information to or read information from the first set of registers or a second set of registers of a second synthetic device, wherein the second synthetic device is connected to the second computer system. In one embodiment, the first synthetic device may be paired with a second synthetic device, wherein the first set of registers are written by the first computer system and read using the second set of registers that are paired with first set of registers to provide a communication change between the first computer system and the second computer system. In one embodiment, each M-lane switch and N-lane switch is a PCIe switch, wherein the first computer system comprises a first DMA engine and the second computer system comprises a second DMA engine.

In part, in another aspect, the disclosure relates to a method of exchanging information between an active compute node and a standby compute node of a fault tolerant system. The method including establishing a DMA datapath between a first compute node and a second compute node, establishing a host-to-host messaging datapath, generating a migration request in response to the first compute node identifying a failure mode, wherein the first compute node is an active compute node, querying a second compute node to assess standby compatibility, wherein the second compute node is a standby compute node, establishing a PCI inventory on the first compute node, establishing a plurality of operations that will be performed on the second compute node to bring the PCI inventory establish on the first compute node into service on the second compute node; and transferring processor state information and memory data from the first compute system to the second computer system through the DMA datapath.

In some embodiments, the method further includes confirming that a migration of data from the first compute node to the second compute node is acknowledged through the host-to-host messaging datapath, and quiescing local devices connected to the first compute node and quiescing processor threads in the first compute node that are unrelated to the migration of data from the first compute node to the second compute node. In some embodiments, the method further includes applying processor state information and memory data to the second compute node and re-provisioning devices from the first compute node to the second compute node. In one embodiment, the method further includes verifying presence of re-provisioned devices in IO domain of second computer system; and changing role of the second compute node to active.

In one embodiment, the re-provisioning step is performed at least in part using modified switch firmware of a second switch, wherein the second compute node comprises the second switch. In one embodiment, the method further includes modifying a first bios of the first compute node and a second bios of the second compute node such that one or more parameters of the first compute node and the second compute node are synchronized.

In part, in yet another aspect, the disclosure relates to a fault tolerant system. The system includes a first computer system comprising a first processor and a first memory; a first IO subsystem comprising a first N-lane switch configured for one or more first devices; a second computer system comprising a second processor and a second memory; a second IO subsystem comprising a second N-lane switch configured for one or more second devices; and an IO side device, wherein the IO side device comprises a plurality of connectors in electrical communication with the first IO subsystem and the second IO subsystem.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation.

These and other features of the applicant's teachings are set forth herein.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. The figures are to be considered illustrative in all aspects and are not intended to limit the invention, the scope of which is defined only by the claims.

DETAILED DESCRIPTION

In many embodiments, the fault tolerant computer architecture includes two compute nodes (also referred to as compute modules or computing systems), two IO domains for storage devices, and two IO domains for non-storage devices. In some embodiments, an IO storage subsystem may include an IO domain and IO nodes. A given IO subsystem may include a switch figured for use with a storage, non-storage, or other IO device. In some embodiments, a failover protocol or a Smart Exchange protocol orchestrates the transference of a CPU state, memory state, and devices state from a failing but active compute node or a predicted to fail compute node to a standby compute node. In some embodiments, the Smart Exchange protocol further includes a low-level device "reprovisioning" process, wherein devices attached to and in communication with an active compute node become attached to and in communication with a standby compute node.

In many embodiments, an active context predicts its own failure. In many embodiments, in response to a prediction of failure, an active context initiates and substantially performs a failover or Smart Exchange process. In many embodiments, performing a Smart Exchange without the coordination of an external processor may reduce software and hardware complexity and cost.

In many embodiments, a Smart Exchange process may include a prediction of failure of an active context, an exchange of processor state and memory state information from an active context to a standby context. A Smart Exchange process further includes an entering of an active context into a brownout phase and a blackout phase, wherein processor threads and memory write operations that are unrelated to the Smart Exchange process, e.g. threads and operations related to a user application, are partially and then completely suspended, and a transfer of a PCI device hierarchy from the active context to the standby context. A Smart Exchange process additionally includes a reprovisioning of attached devices from an active context to a standby context, and finally a transition of a previously active context into a standby context, and a transition of a context previously in a standby state into a newly active context. In these various stages of the Smart Exchange process, the two different hosts (the active context and the passive context, or equivalently the compute nodes that host these contexts) may exchange memory or other states via direct memory access (DMA), and may exchange various messages via a host-to-host communications protocol. In some embodiments, a host-to-host communications protocol may include the reading and writing of messages to registers within a PCI switch on an IO domain.

Figure 1A:
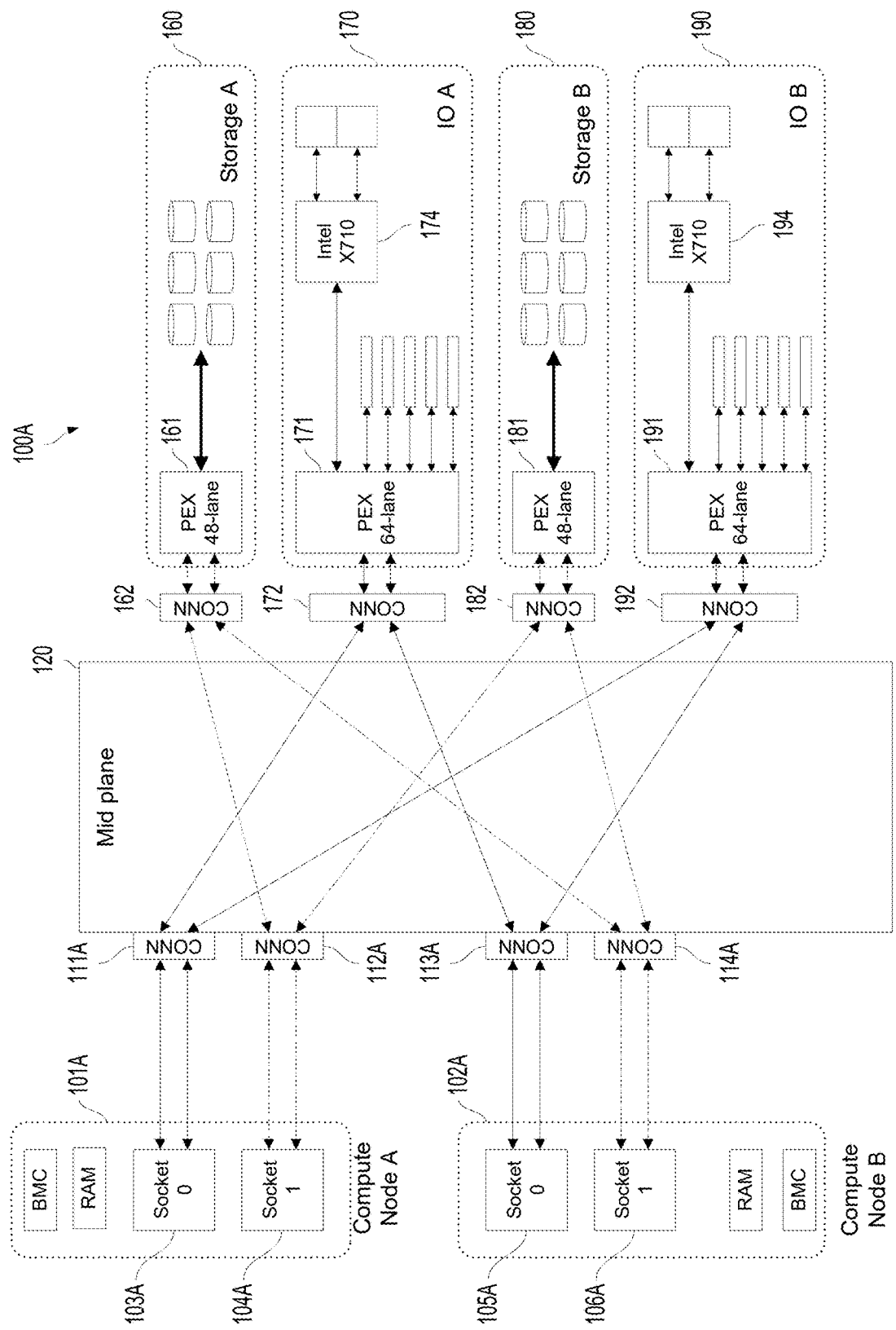
FIG. 1A is a diagram of a fault tolerant computer system, comprising two IO storage domains, two IO device domains, and two compute nodes, each compute node with two physical CPUs (two sockets for two processors), according to an exemplary embodiment of the disclosure.

Refer now to the embodiment of FIG. 1A. FIG. 1A is a block diagram of a fault tolerant computer system 100A, comprising two compute nodes, such as a first compute node 101A and a second compute node 102A; two storage domains, such as a first storage domain 160 and a second storage domain 180; and two input-output (IO) device (non-storage) domains, such as a first IO domain 170 and a second IO domain 190. Some additional detail relating to compute node components are depicted and described in more detail with regard to FIG. 10.

In some embodiments, a compute node includes two physical CPUs, each physical CPU anchored in the compute node via a socket, such as a first socket 103A or 105A and a second socket 104A or 106A. In other embodiments, a compute node may include a single physical CPU and a single socket, see for example the embodiment of FIG. 1B.

In various embodiments, every storage domain and every IO domain contains a PCIe switch. For example the first storage domain 160 has a switch such as PCIe switch 161, the second storage domain 180 has a PCIe switch 181, the first IO domain has a PCIe switch 171, and the second IO domain has a PCIe switch 191. Further, each compute node has a plurality of PCIe root ports. The structure of the PCIe hierarchy as seen from each node is the subject of another embodiment, shown later. In some embodiments, a PCIe switch may be a PEX-88000 switch. References to PEX herein generally refer to a switch that can be used for various components and subsystems to interconnect the compute nodes on one side of the midplane with IO subsystems (storage and non-storage) such as IO domains on the other side of the midplane. In some embodiments, the switches described herein such as PCIe switches support multi-host PCI Express switching capability. In various embodiments, an IO device domain 170, 190 contains a network interface 174, 194. Furthermore, in many embodiments, the network interface is in communication with a plurality of Ethernet ports 175, 195. In some embodiments, the network interface may be an Intel X710 or another network interface device. In most embodiments, the PCIe switch of an IO device domain mediates access the external devices and the network interface. In various embodiments, an IO storage domain 160, 180 has a plurality of attached storage devices 163, 183. In most embodiments, the PCIe switch of an IO storage domain mediates access the attached storage devices.

In most embodiments, each IO domain and each storage domain has a physical connection to each compute node via these devices' PCIe switches and midplane 120. The PCIe switches are interconnected through the midplane via connectors 111A, 112A, 113A, 114A at the compute nodes, connectors 162, 182 at the storage domains, and connectors 172, 192 at the IO domains. In many embodiments, an interconnection between a PEX and a connector may be a PCIe Gen4 x8 interconnection. In some embodiments, the connectors may be M.2 connectors, NVMe connectors or other PCI or PCI compatible connectors and combinations thereof. The midplane 120 may also include a power connection 150 suitable for connecting to a power source to support any connections such as for example any of 11A, 112A, 113A, 114A or 162, 172, 182, 192 that are power connectors.

In various embodiments, the midplane distributes power from one or more power supplies to each of the plug-in nodes (compute nodes, storage IO nodes, and non-storage IO nodes) and is customized to support fault tolerant operation and the processes disclosed herein. The midplane may include one or more boards and has two sides one facing the compute nodes and one facing the IO subsystems. The midplane may also include a support chassis and power supply features for the various node connectors. In various embodiments, the midplane may also contain active components such as PCI retimers, fan-out switches, or other active components. Compute nodes, IO bays, non-storage IO devices and storage bays are all pluggable nodes that connect to the midplane. The switches in the IO nodes and storage nodes and those in the compute nodes and/or other parts of the system support the interconnection of the components on either side of the midplane and the ability for all of the connected components to exchange information there between.

Figure 1B:
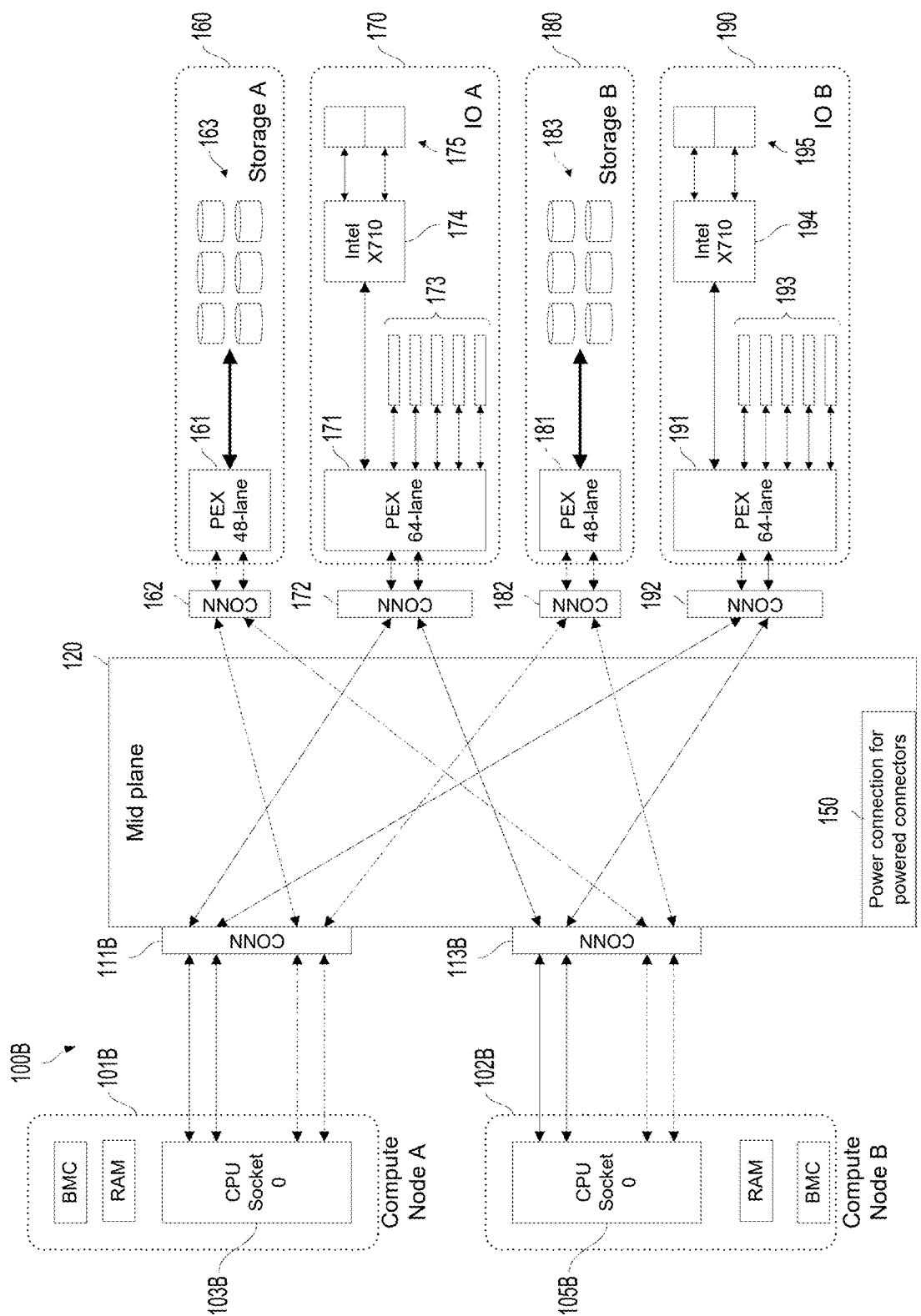
FIG. 1B is a diagram of a fault tolerant computer system, comprising two IO storage domains, two IO device domains, and two compute nodes, each compute node with one physical CPU (one socket), according to an exemplary embodiment of the disclosure.

Refer now to the embodiment of FIG. 1B. FIG. 1B is a block diagram of an alternate design of a fault tolerant computer system. The embodiment of FIG. 1B is identical to that of the embodiment of FIG. 1A, with the exception of number of physical CPUs and sockets in a compute node. In the embodiment of FIG. 1B, each compute node 101B, 102B includes a single physical CPU and so a single CPU socket 103B, 105B. Similarly, the first compute node 101B is in communication with the midplane via a single connector 111B and the second compute node 102B is in communication with the midplane via a single connector 113B. In many embodiments, an interconnection between a PEX and a connector may be a PCIe Gen4 x8 interconnection. A given compute node may include one or more PCIe switches that connect to the midplane via a connector. In some embodiments, the various midplane connectors may be powered as a result of the midplane connecting to a power source as needed for the various devices interfacing with midplane connections. In various embodiments, the midplane may include an IO side device or IO side. In various embodiments, the midplane may include a processor side device or processor side.

Figure 2:
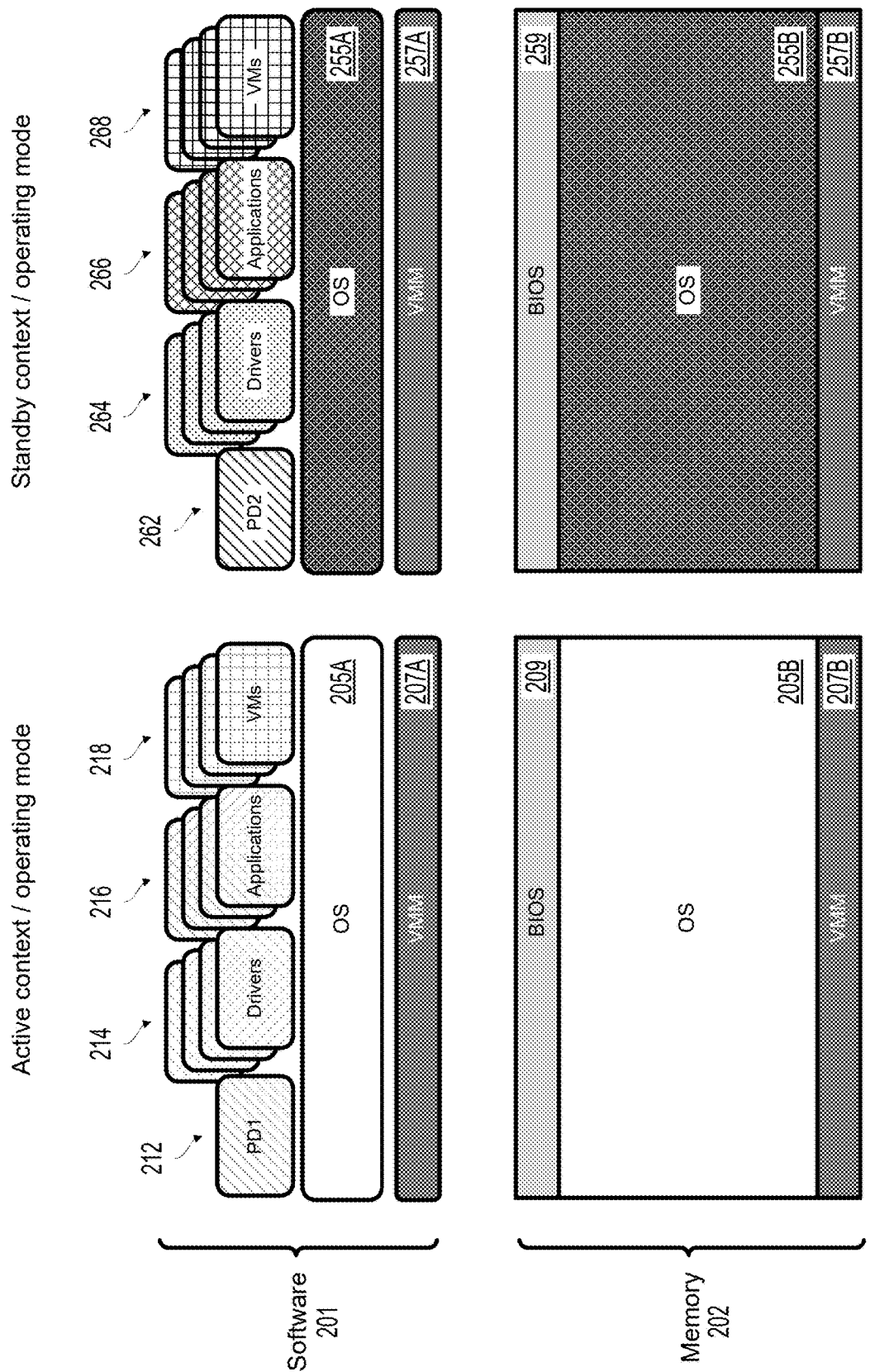
FIG. 2 is a block diagram of memory content and software on both an active CPU context and a standby CPU context that participate in a Smart Exchange according to an exemplary embodiment of the disclosure.

Refer now to the embodiment of FIG. 2. FIG. 2 is a block diagram of the software 201 hosted on both an active and a standby context, as well as memory content of an active and a standby context in a fault tolerant computer system. In many embodiments, a compute node hosts an active context or a standby context. In many embodiments, a context, such as an active context or a standby context, includes software, memory, and various CPU threads on an associated compute node that may access or execute memory or software. In some embodiments, the software hosted by an active context may include a platform driver 212, a plurality of drivers 214, a plurality of user applications 216, and a plurality of virtual machines (VMs) 218. In many embodiments, a platform driver may include various Smart Exchange processing and control routines, such as routines for device reprovisioning, host-to-host messaging, PCI inventory collection, and processing and control routines for brownout and blackout phases. The two platform drivers for the first and second computing system/compute node or two platform drivers generally may also be identified as PD1 and PD2.

Software hosted on the active context may further include an operating system (OS) 205A, and a virtual machine manager (VMM) image 207A. In various embodiments, a VMM may coordinate various aspects of a Smart Exchange process. In many embodiments, the memory content 202 of an active context includes memory associated with a BIOS 209, memory associated with an operating system 205B, and memory associated with a VMM 207B. In many embodiments, memory associated with a BIOS 209 may be of a limited size and at the top of addressable memory, memory associated with a VMM 207B may be of a limited size and at the bottom of addressable memory, and memory associated with an operating system 205B may include the rest of the available memory space.

In many embodiments, a standby context similarly hosts an operating system 255A, a virtual machine manager image 257A, a platform driver 262, a plurality of drivers 264, a plurality of applications 266, and a plurality of virtual machines 268. In many embodiments, the memory of a standby context is similarly allocated to a BIOS 259, an operating system 255B, and a VMM 257B. In most embodiments, the VMM image 207A in the active context is identical or substantially the same as the VMM image 257A in the standby context, and in most embodiments, the target memory locations 207B and 257B for the VMM images are identical in the active and standby contexts. In various embodiments, each of these software components or memory allocations in a standby context may be in a different state, such as in a standby state, from the matching software component or memory allocation in the active context. The platform driver may be a kernel mode driver in the operating system that supports operating system data exchange with various hardware and software components of the fault tolerant system.

Figure 3:
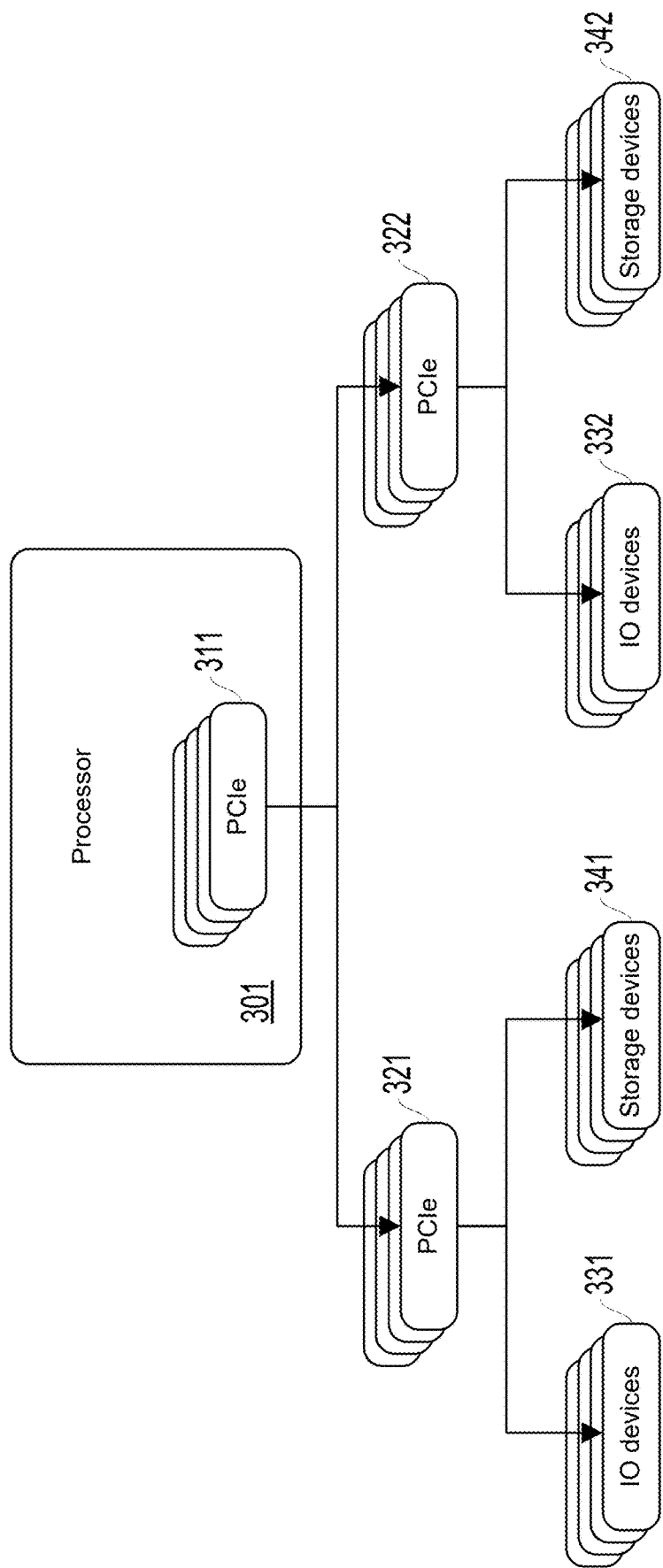
FIG. 3 is a high-level block diagram of a PCIe device hierarchy according to an exemplary embodiment of the disclosure.

Refer now to the embodiment of FIG. 3. FIG. 3 is a block diagram of a PCI device hierarchy, as seen from a compute node 301. In most embodiments, each compute node contains its own internal PCIe hierarchy as well as PCIe root ports 311 within each processor that provide the interconnect to external PCIe switches 321, 322 on the IO device domains and IO storage domains. In turn, each IO domain and PCIe switch 321, 322 contains its own hierarchy, 331, 341, 332, 342. In many embodiments, when a platform driver first loads, it compiles a list of PCIe sub-hierarchy base addresses from which to collect inventory data. In many embodiments, a Smart Exchange process replicates a PCIe device hierarchy from an active context to a standby context. In many embodiments, a Smart Exchange process further performs a low-level reassignment or "reprovisioning" of the devices in use by the active context from one physical compute node to another compute node.

In many embodiments, the platform driver implements the PCIe device reprovisioning process, as well as additional Smart Exchange processing and control operations, including host-to-host messaging, DMA device initialization and control, NT device initialization and control, brownout and blackout memory tracking and state management, virtual machine manager (VMM) loading and unloading and control, quiescing and resuming device drivers, switch firmware API command processing and error handling, and other operations.

In many embodiments, the reprovisioning process is a function performed by modified switch firmware of a PCIe switch. For various implementations of the fault tolerant computing system, the firmware of the various PCIe switches in the storage and non-storage IO subsystems are modified to provide the functions described herein. In some embodiments, a PCIe switch may provide API operations to perform assign or unassign operations on downstream ports, which may be performed by any host connected to the switch. However, in many embodiments an API-provided assign operation often triggers a reset of the device state and a hotplug event that is transmitted to an upstream port. In various embodiments of a fault tolerant computer system designed to replace an active context with a standby context seamlessly, a device reset and a hotplug event are undesirable.

In various embodiments, a device reprovisioning process occurs during a blackout phase and a modified switch firmware provides a single API operation to perform all necessary device-level reassignment operations. This single operation both simplifies and expedites the platform driver handling and allows the operations to be performed effectively in parallel on all IO switches and storage switches. Because these firmware operations can fail on any switch, the modified switch firmware API calls also provide a simple method for restoring results of a previous provisioning process. In some embodiments, if a failure occurs, configurations for IO and storage devices may be restored to the active but failing compute node.

Figure 4:
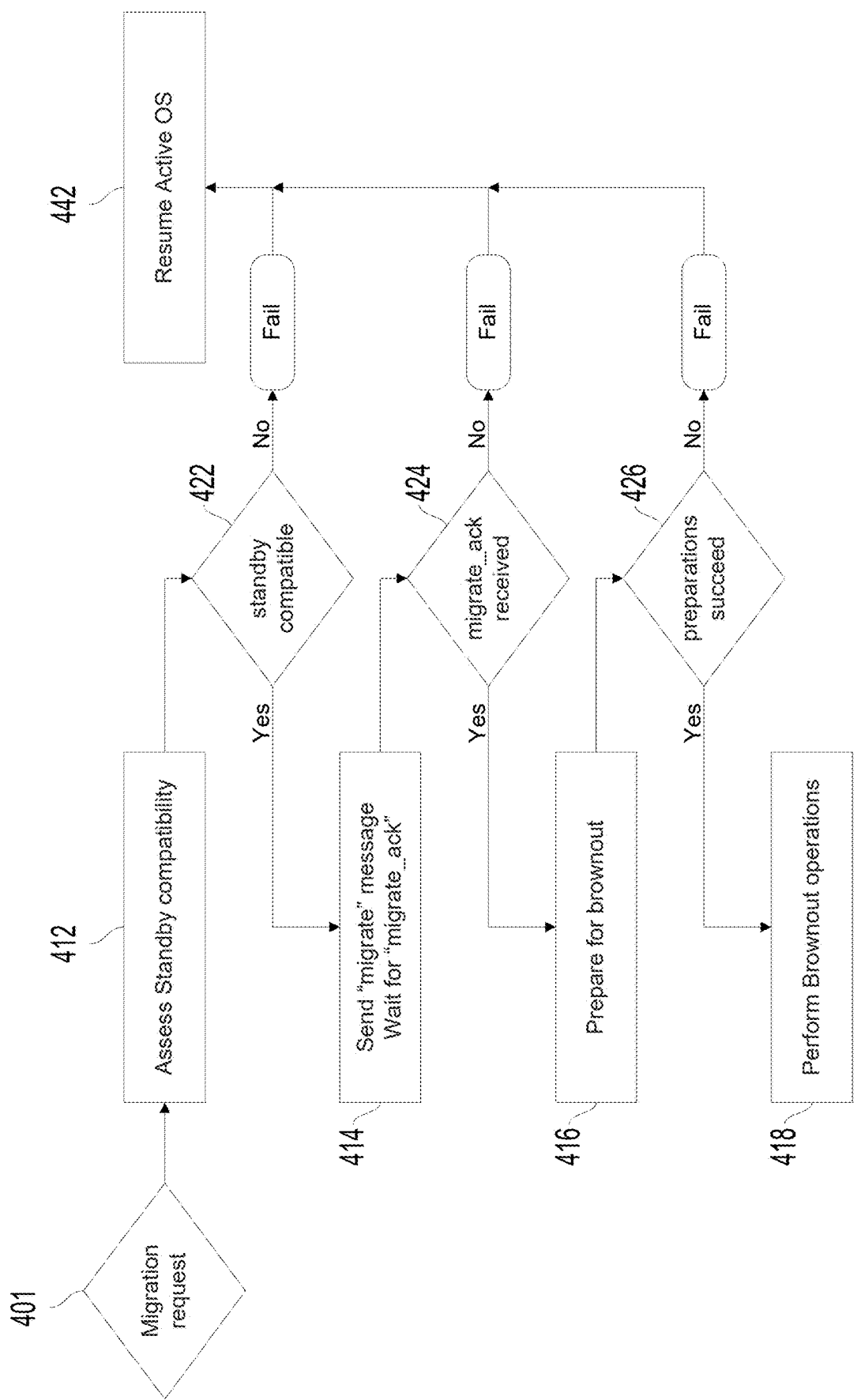
FIG. 4 is a flow chart of a first phase of a smart exchange process on a failing compute node according to an exemplary embodiment of the disclosure.

Refer now to the embodiment of FIG. 4. FIG. 4 is a flow chart of a first phase of a Smart Exchange or failover process on an active but failing or predicted to fail context. In a Smart Exchange process, a compute node hosting an active context or otherwise operating as an active system being used to run applications such as customer applications or virtual machines is identified as failing or predicted to fail, and so initiates a transfer of its active context to an alternate compute node. The alternate compute node is operating but not being used in active mode and as such can take over as a standby for a failing active compute node. In an alternate embodiment, the alternate compute node could be running another active context (active compute note), but one which is deemed to be of lower priority than the one on the failing compute node. In such an embodiment, this lower-priority active context could be rebooted to a standby context (standby node) in order to participate as the target of the smart exchange. The standby computer hosts a standby context, anticipating the transfer, and effectively is configured to go through a live migration, failover, or other process to get state information from the active compute node and take over its applications. In many embodiments, it is the compute node that hosts the active context that identifies or predicts its own failure, and so initiates the transfer of the active context.

In the embodiment of FIG. 4, a migration request 401 is sent by the compute node that hosts the active context. Following a migration request, an active context assesses 412 the compatibility of a standby context as a candidate to replace the active context in a Smart Exchange process. In many embodiments, a decision 422 follows: if the standby context is incompatible, the Smart Exchange process fails and the active context resumes 442 regular (if potentially compromised) execution of its operating system (OS); if the standby context/compute node is compatible with the active context/compute node, then the active context sends 414 a "migrate" message to the standby context, and waits for a "migrate_ack" acknowledgement message. In many embodiments, a decision 424 follows: if a "migrate_ack" acknowledgement message is not received, the Smart Exchange process fails and the active context resumes 442 regular execution; if a "message_ack" message is received, the active context prepares 416 for a brownout phase. In many embodiments, before sending a "migrate_ack" message, a standby context performs a plurality of steps. The standby context may quiesce its local devices, enable direct memory access (DMA) engines to receive data. In many embodiments, a period of time during which memory is copied while DMA traffic is still occurring constitutes the brownout phase. If the preparations for the brownout phase are successful 4236, then the system performs brownout operations 418. During brownout and the subsequent blackout phases, memory that has been modified must be tracked and subsequently copied, when DMA traffic is halted. During the brownout phase, modified memory pages can be re-copied while the platform driver and host software continue to track newly-modified memory pages.

Figure 5:
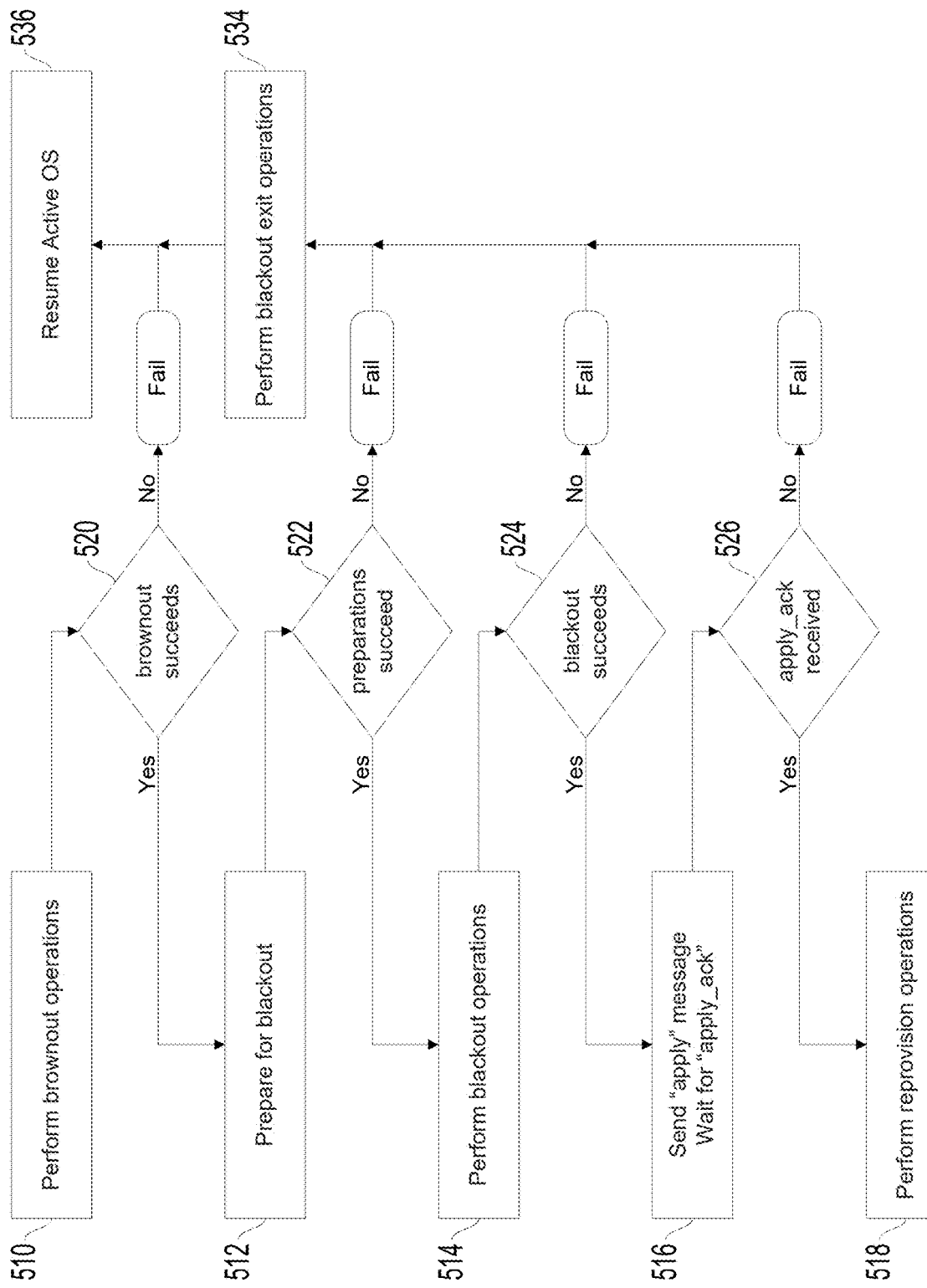
FIG. 5 is a flow chart of a second phase of a smart exchange process on a failing compute node according to an exemplary embodiment of the disclosure.

Refer now to the embodiment of FIG. 5. FIG. 5 is a flow chart of a second phase of a Smart Exchange or failover process on an active but failing or predicted to fail context. In the second phase, the active context that has requested a migration performs brownout operations 510. In many embodiments, if the brownout succeeds 520, the active context prepares for a blackout phase 512. In many embodiments, if the brownout fails, the active context will resume normal execution 536. In many embodiments, a preparation for a blackout phase includes transmission of the full memory range of the active context to the standby context and an iterative transmission of all memory pages modified during any brownout phases. In various embodiments, if these preparations for a blackout phase succeed 522, the active context signals its drivers, which are tracking DMA memory access, to pause all DMA traffic. The active context subsequently enters a blackout phase 514. In many embodiments, if the preparation for the blackout phase fails, the active context will exit any preparations for the blackout phase 534 and resume normal execution 536. In various embodiments, active context refers to a computer operating in the role or mode of an active compute node and a standby context refers to a computer operating in the role or mode of a standby compute node. The active and standby contexts/ roles may change over time.

In various embodiments, having entered a blackout phase, the active context will quiesce its local devices, collect an inventory of its PCI hierarchy, enter a VMM on all of its processors, transmit to the standby context any remaining modified memory pages, and finally collect and transmit to the standby context the state of the active context's processor and attached devices. No system workload on the active context is processed during the blackout phase. In the blackout phase, CPU threads unrelated to the Smart Exchange are all paused and system interrupt processing is disabled to prevent further modification of memory pages. At this time, the final list of pages modified by either CPU access or DMA access is copied to the standby context. Once all the memory of the active but failing context has been copied, the active but failing context saves the internal state of its processors-including its registers, local Advanced Programmable Interrupt Controller, High Precision Event Timer, etc.—to a memory location and copies that data to the standby context, where it is subsequently restored into the corresponding registers of the standby context. In most embodiments, if these blackout operations succeed 524, the active context will send an "apply" message to the standby context, signifying that the complete transmitted state (the PCI hierarchy, memory state, processor and device state) should be applied by the standby context. In many embodiments, the active context finally waits for an "apply_ack" acknowledgement message from the standby context. In many embodiments, having received the complete state of the active context as well as an "apply" message from the active context, the standby context will apply and verify the processor state, the PCI state, and the device states, and send an "apply_ack" message to the active context if the state application is successful. In many embodiments, if the state application is successful and the "apply_ack" message is received 526 by the active context, the active context will perform device reprovisioning operations 518 and enter into a third phase of a Smart Exchange process.

Figure 6:
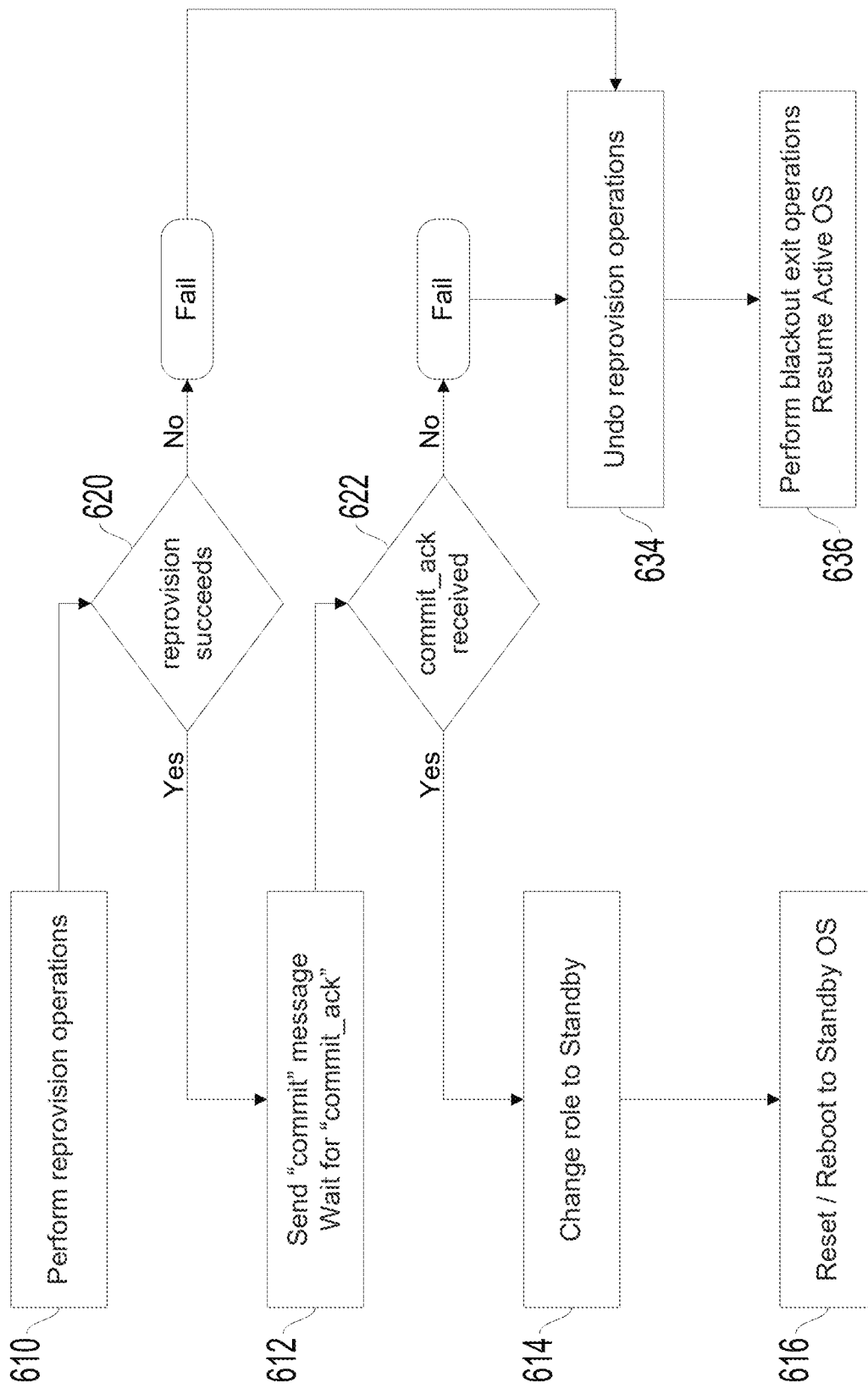
FIG. 6 is a flow chart of a third phase of a smart exchange process on a failing compute node according to an exemplary embodiment of the disclosure.

Refer now to the embodiment of FIG. 6. FIG. 6 is a flow chart illustrating a third phase of a Smart Exchange or failover process on an active context immediately prior to its assuming the role of a standby context. In many embodiments, in the third phase, the failing CPU performs device reprovisioning operations 610, testing for success or failure 620. If the reprovisioning operations fail, the operations are reversed 634, the blackout operations are reversed 636 and the active context resumes normal operation without transition to the standby CPU. In many embodiments, if the device reprovisioning operations are successful, the active context sends 612 a "commit" message to the standby context and waits for a "commit_ack" acknowledgement response from the standby context 622. In most embodiments, the standby context has, at this point, assumed the complete processor state, memory state, and PCI hierarchy of the active context. If devices attached to the active context are reprovisioned successfully for the standby context, the standby context will send a "commit_ack" acknowledgement message to the active context and the standby context will change its role to the active context. What was previously the active context on the failing compute node similarly changes 614 its role to a standby context, and finally reboots 616 into a standby state.

Figure 7:
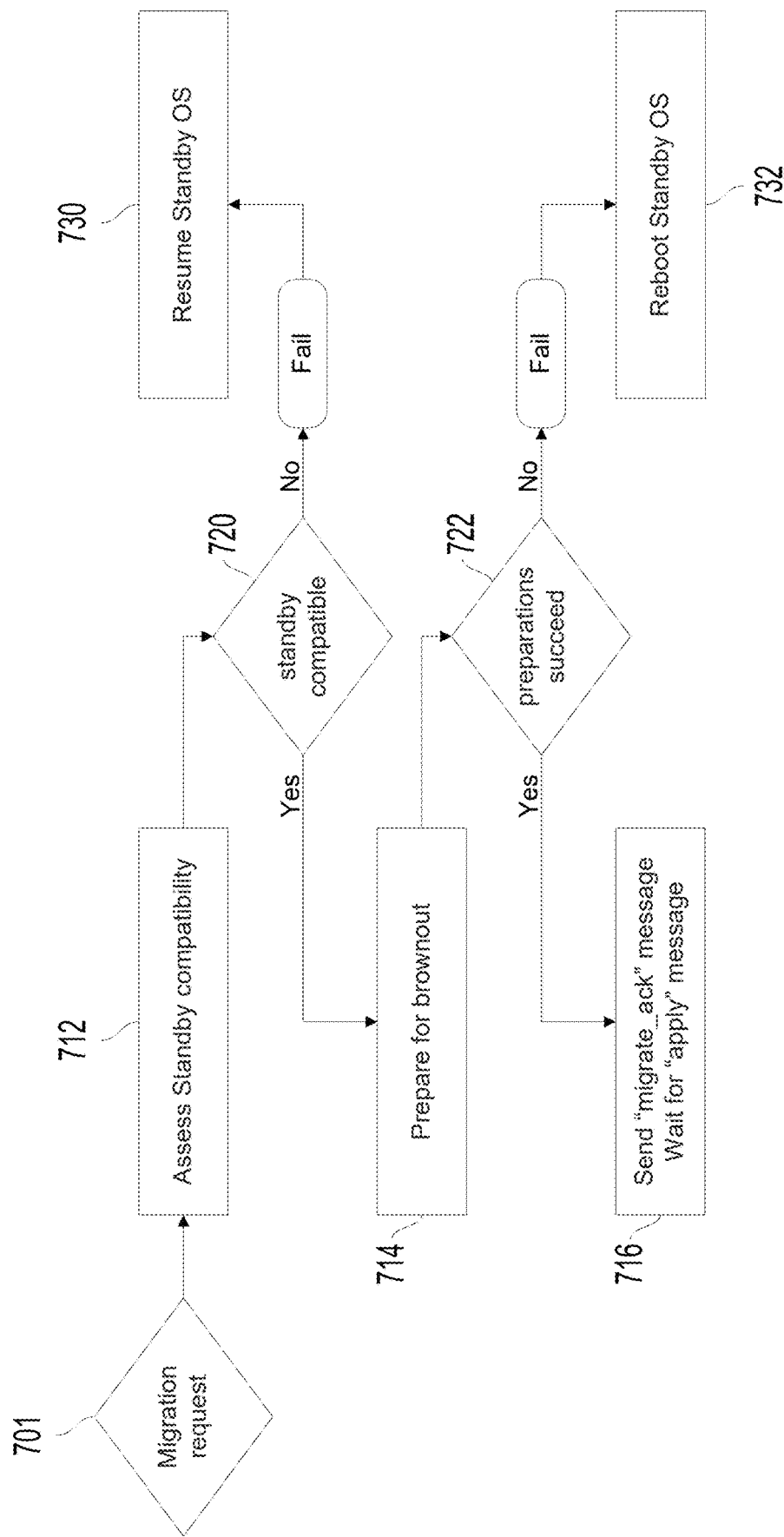
FIG. 7 is a flow chart of a first phase of a smart exchange process on a standby compute node according to an exemplary embodiment of the disclosure.
Figure 8:
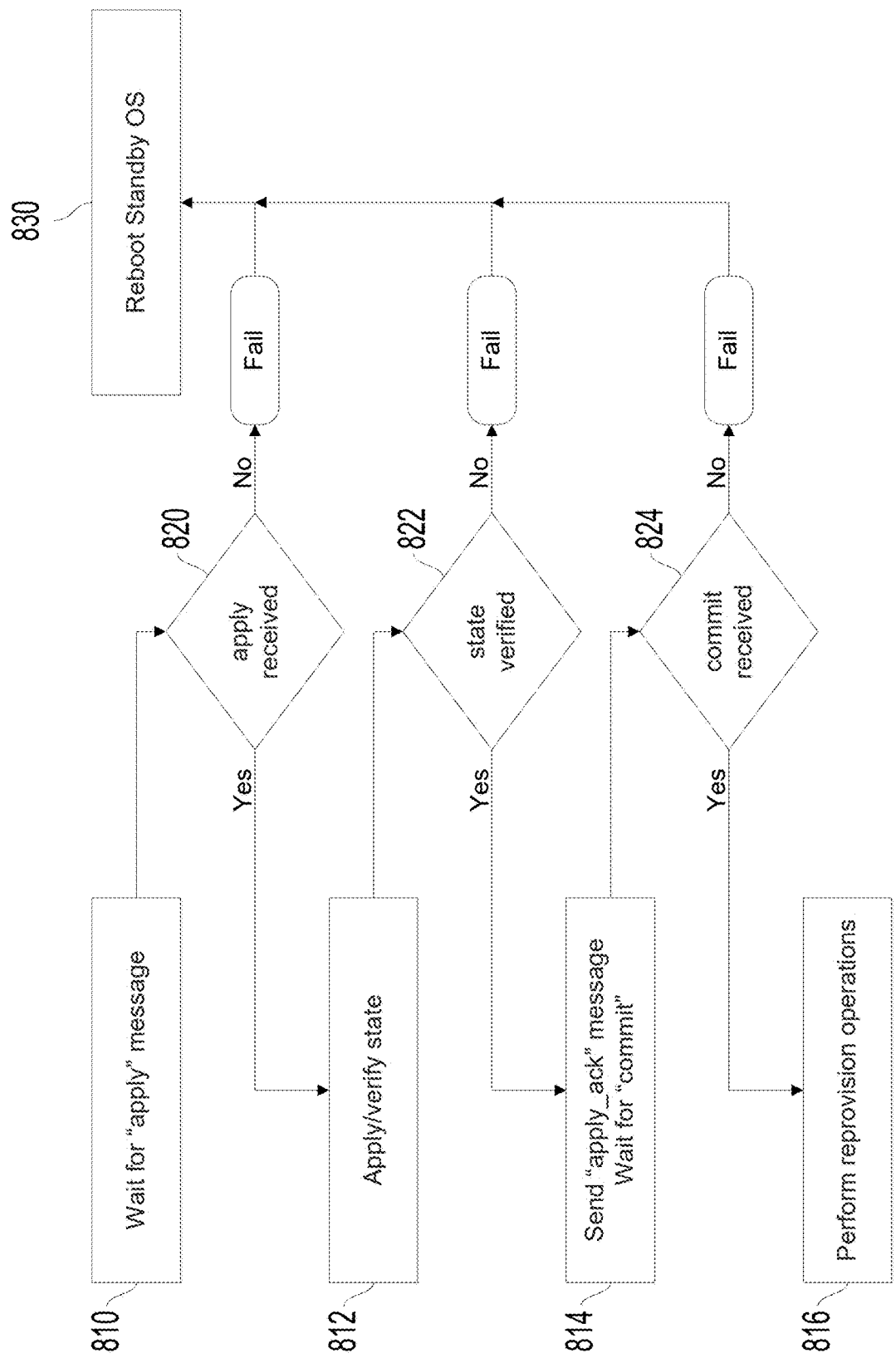
FIG. 8 is a flow chart of a second phase of a smart exchange process on a standby compute node according to an exemplary embodiment of the disclosure.
Figure 9:
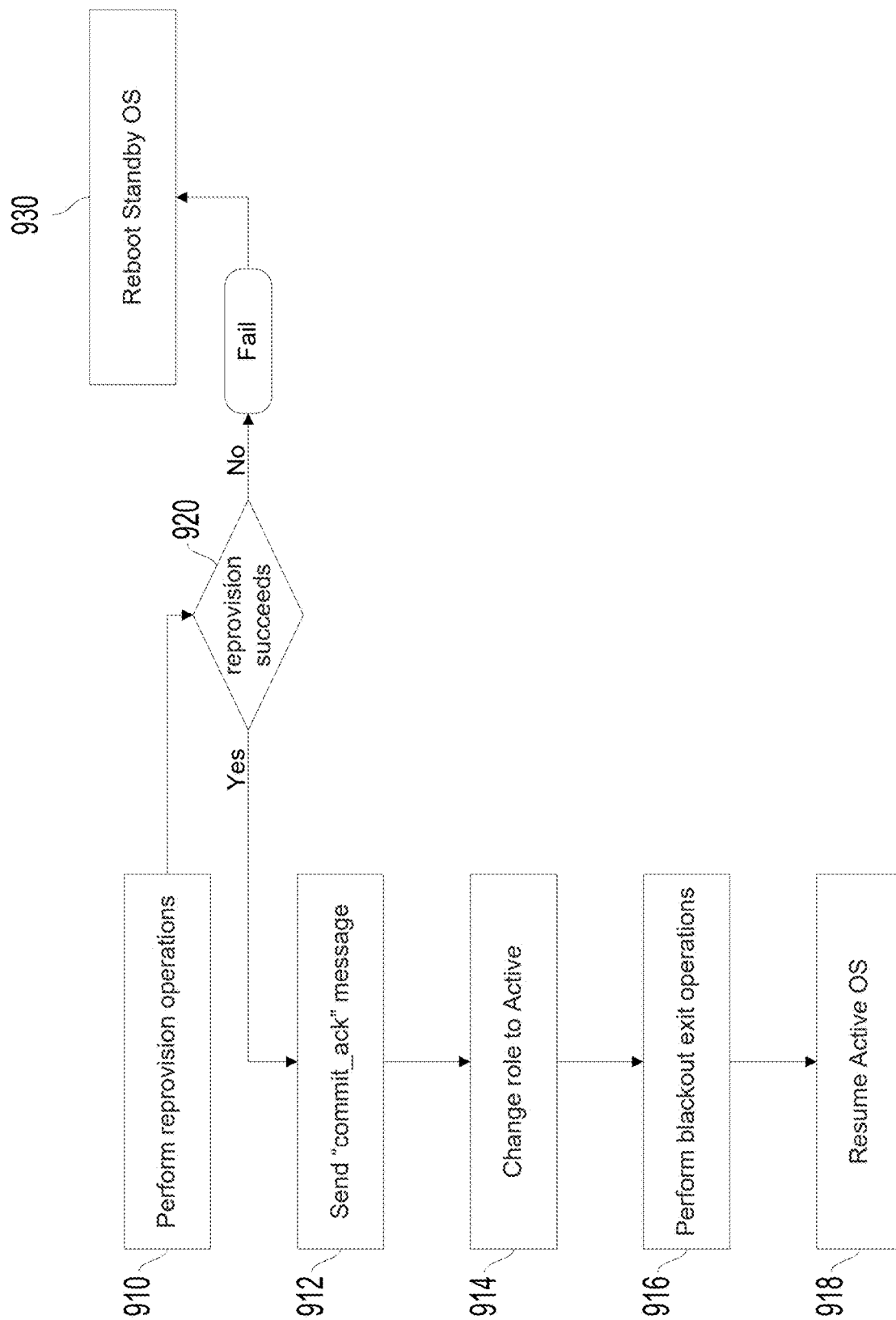
FIG. 9 is a flow chart of a third phase of a smart exchange process on a standby compute node according to an exemplary embodiment of the disclosure.

The embodiments of FIGS. 4, 5, and 6, depicting a first phase, a second phase, and a third phase of a Smart Exchange protocol substantially from the perspective of the active context that is to be replaced, are mirrored in the embodiments of FIGS. 7, 8, and 9, which depict these three phases of a Smart Exchange protocol from the perspective of the standby context.

Refer now to the embodiment of FIG. 7. FIG. 7 is a flow chart of a first phase of a Smart Exchange or failover process on a standby context. In the first phase, a standby context receives a migration request 701 and assesses its compatibility as a replacement for the active context 712. If the standby context is compatible 720, the context will prepare for a brownout phase 714. If the standby context is incompatible, it will resume its normal operation 730. In many embodiments, brownout preparations include quiescing local devices, enabling direct memory access engines to receive data such as memory pages, and entering a virtual machine manager (VMM). Assuming the standby context is compatible and the brownout preparations are successful 722, the standby context sends a "migrate_ack" message acknowledgement 716 in response to the active context's "migrate" message. If, however, brownout preparations are not successful in the standby context, the Smart Exchange process fails and the standby context reboots its operating system 732.

Refer now to the embodiment of FIG. 8. FIG. 8 is a flow chart of a second phase of a Smart Exchange or failover process on a standby context. In the second phase, a standby context receives the processor and device state of the active context before the active context enters a blackout phase. In various embodiments, the standby context waits 810 for an "apply" message from the active context. A decision 820 follows: if no "apply" message is received, the standby context reboots its operating system 830, but if an "apply" message is received, the standby context applies and verifies 812 the state information received by the active context. In some embodiments, a decision 822 follows. If the state is unable to be applied and verified, the standby context reboots its operating system 830, but if the state is successfully applied and verified, the standby context sends 814 an "apply_ack" message to the active context and awaits a "commit" message, indicating that devices should be reprovisioned for the standby context. In many embodiments, a decision 824 follows: if no "commit" message is received, the standby context reboots its operating system 830, but if a "commit" message is received, the standby context will perform device reprovisioning operations 816.

Refer now to FIG. 9. FIG. 9 is a flow chart of a third phase of a Smart Exchange or failover process on a standby context. In many embodiments, upon entering the third phase, the standby context performs device reprovisioning operations 910. In some embodiments, a decision 920 follows. If device reprovisioning is unsuccessful, the standby node reboots its operating system 930. If device reprovisioning is successful, the standby context sends 912 a "commit_ack" message to the previously active context, and the standby context becomes 914 the new active context. Finally, the new active context exits the blackout phase 916 and resumes normal operation of all applications and devices that were operating on the previously active node. Resuming normal operation is shown with the resume active OS step 918.

Figure 10:
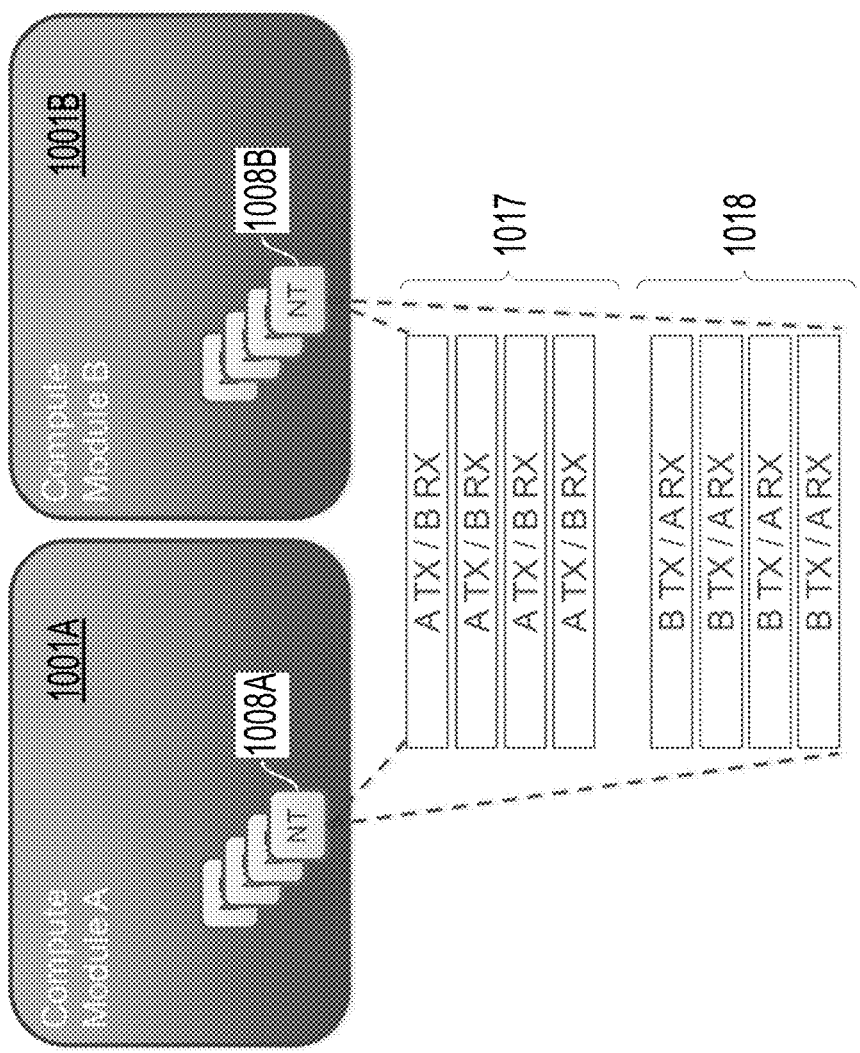
FIG. 10 is a block diagram of a fault tolerant computer system, illustrating a host-to-host messaging architecture according to an exemplary embodiment of the disclosure.
Figure 10:
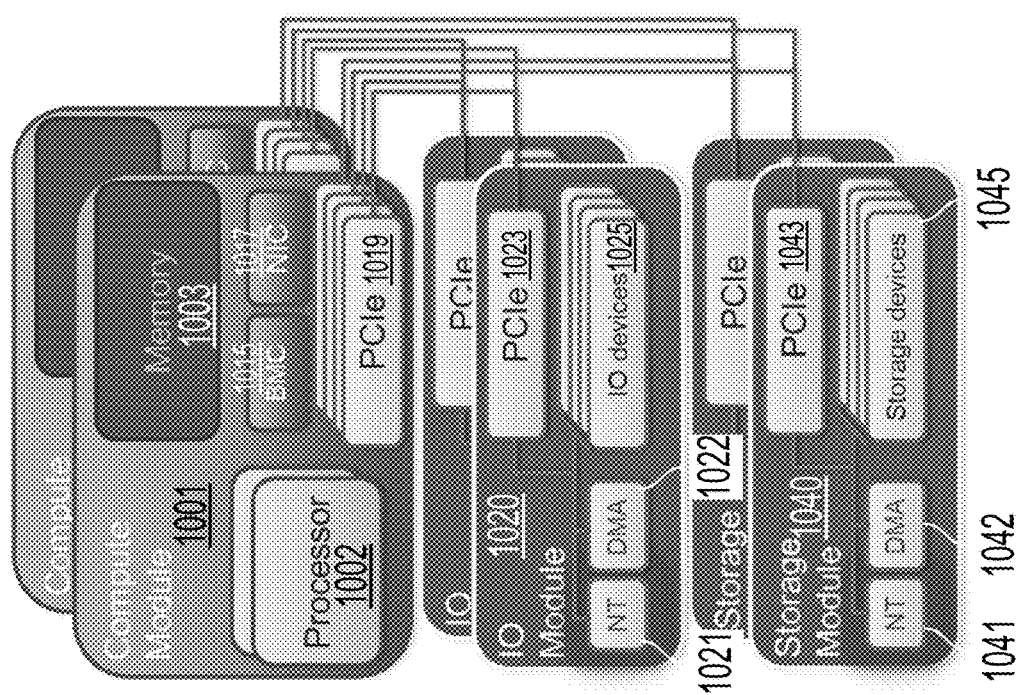

Refer now to the embodiment of FIG. 10. FIG. 10 represents a host-to-host messaging architecture. In many embodiments, each compute node or compute module 1001 contains a processor 1002, a memory 1003, a BMC baseboard management controller 1015, a network interface card (NIC) 1017, and a plurality of PCIe root ports 1019. In many embodiments, the PCIe root ports are in communication with PCIe switches 1023 located on IO device domains 1020, as well as PCIe switches 1043 on IO storage domains 1040. The PCIe switch 1023 on an IO device domain 1020 mediates access to a virtual "NT" device 1021, direct memory access (DMA) facilities 1022, and a plurality of IO non-storage devices 1025. Similarly, in many embodiments, the PCIe switch 1043 on an IO storage domain 1040 mediates access to a virtual "NT" device 1041, DMA facilities 1042, and a plurality of storage devices 1045. In some embodiments, the PCIe switch on an IO storage domain or an IO device (non-storage) domain may be a PEX-88000 switch. Further, in many embodiments, each compute node 1001A, 1001B contains a plurality of synthetic NT devices 1008A, 1008B. The BMC 1015 is an independent embedded processors which provide a number of management functions such as environmental monitoring (e.g. system temperature), remote keyboard/video, remote media capabilities, and remote power control. In some embodiments, NT refers to a PCIe Non-Transparent Bridging device that connects two independent host address domains and provides a shared register space and/or Memory-Mapped IO (MMIO) space.

In various embodiments, the BMC of a given first and second (active and standby) compute node may support an Intelligent Platform Management Interface (IPMI) between the operating system on each compute node and its local BMC. As a result, the operating system of each compute node may use the interface to query a local BMC. In many embodiments, a first compute node is typically connected to a second compute node by a sideband communication channel such as a PCI or PCIe or other communication channel or bus.

In many embodiments, the NT device is a synthetic device presented by a firmware of a PCIe switch. In many embodiments, an NT device configuration space contains a set of eight 32-bit scratch registers 1017, 1018. In many embodiments, reading from and writing to these NT scratch registers represents a host-to-host communications protocol by which various messages, for example the messages described in the embodiments of FIGS. 4-9, may be exchanged between an active context and a standby context. The switches such as the PCIe and other switches that may be included in the compute node and the various IP domain components may contain scratchpad registers accessible via an operation system platform driver PD1, PD2 on each compute node that the operating systems can use exchange to exchange information and perform many of the data exchange related processes described herein. In some embodiments, the registers disclosed herein are non-transparent bridge (NTB) registers.

In most embodiments, NT devices may be paired across hosts such that the NT scratch registers may be written to by one host and read by a different host. In many embodiments, each PCIe switch synthesizes one NT device 1008A, 1008B in each compute node's hierarchy, and each compute node's NT device is paired with the other compute node's NT device in the same switch, allowing each compute node to read from and write to the scratch registers as though they were local devices. In many embodiments, the eight scratch registers are divided into two groups, such as a first group 1017 and a second group 1018, wherein a first compute node 1001A transmits data to the first group of registers and a second compute node 1001B receives data from the first group of registers. Similarly, the second compute node transmits data to the second group of registers, and the first compute node receives data from the second group of registers. In some embodiments, each group of registers may be further divided into four individual registers, such that the first group of registers includes a first register, a second register, a third register, and a fourth register, and such that the second group of registers includes a fifth register, a sixth register, a seventh register, and an eighth register.

Figure 11:
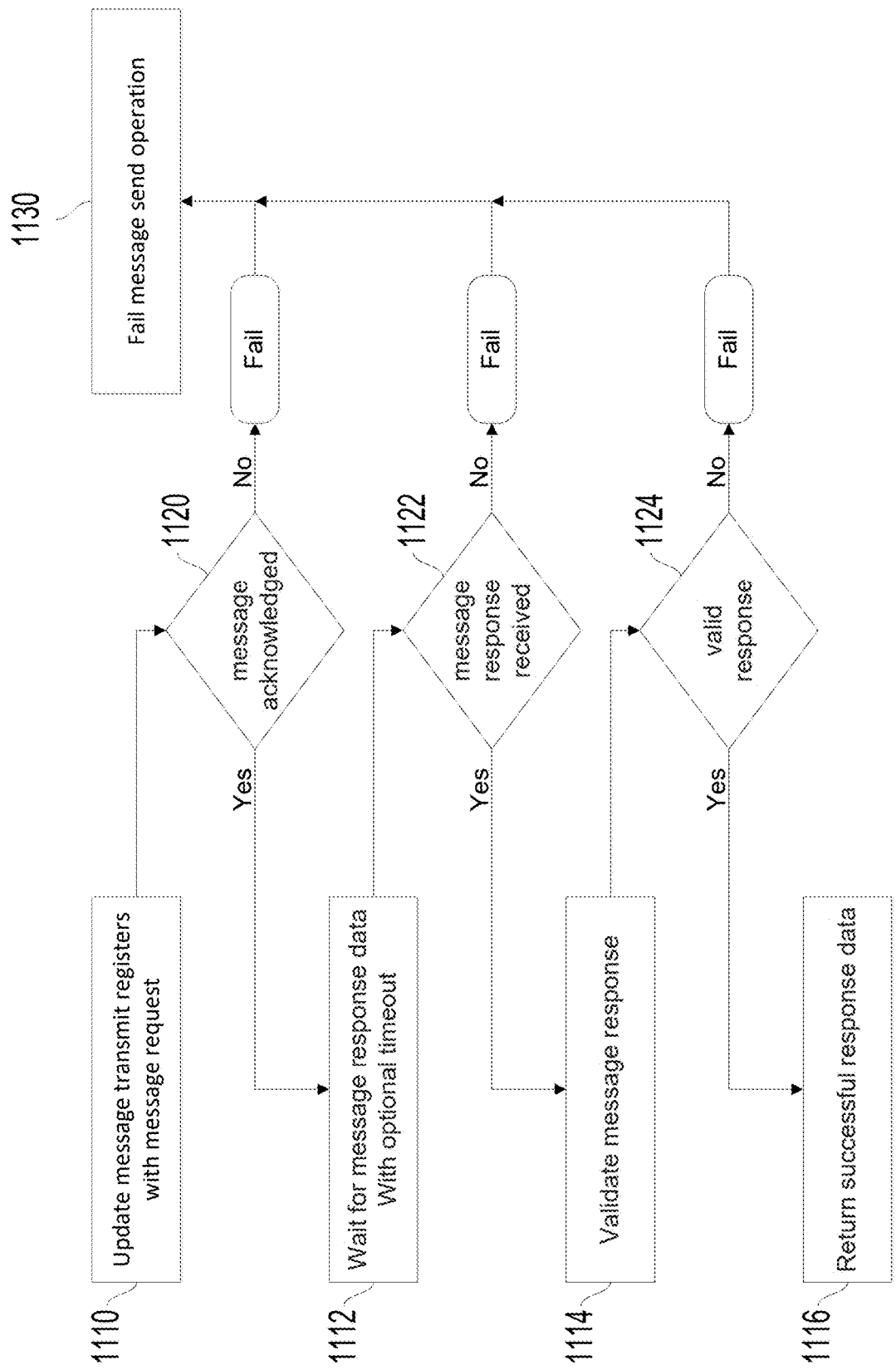
FIG. 11 is a flow chart of a host-to-host messaging process on a compute node sending a message according to an exemplary embodiment of the disclosure.

Refer now to FIG. 11. FIG. 11 is a flow chart representing a process wherein a first host sends a message to a second host via a host-to-host communications protocol. In some embodiments, the first host updates 1110 message transmit registers with a message request. A message request includes writing a message identification value to the first register, and writing message data to the second, third, and fourth registers. In many embodiments, the first host waits 1120 for a message receipt acknowledgement from the second host, comprising a zeroing of the first register. In many embodiments, if a message receipt is not acknowledged, the overall message send operation is considered to have failed 1130. In many embodiments, if the message receipt is acknowledged, the first host awaits 1112 a response message with an optional timeout duration by polling the fifth register for a response message identification value. In many embodiments, a decision 1122 follows. If a response message is not received, the overall message send operation fails 1130. If a response message is received, the first host validates 1114 the response message. In some embodiments, a decision 1124 follows. If the response message is not validated, the overall message send operation has failed 1130. If, however, the response message is validated, the message response is returned 1116.

Figure 12:
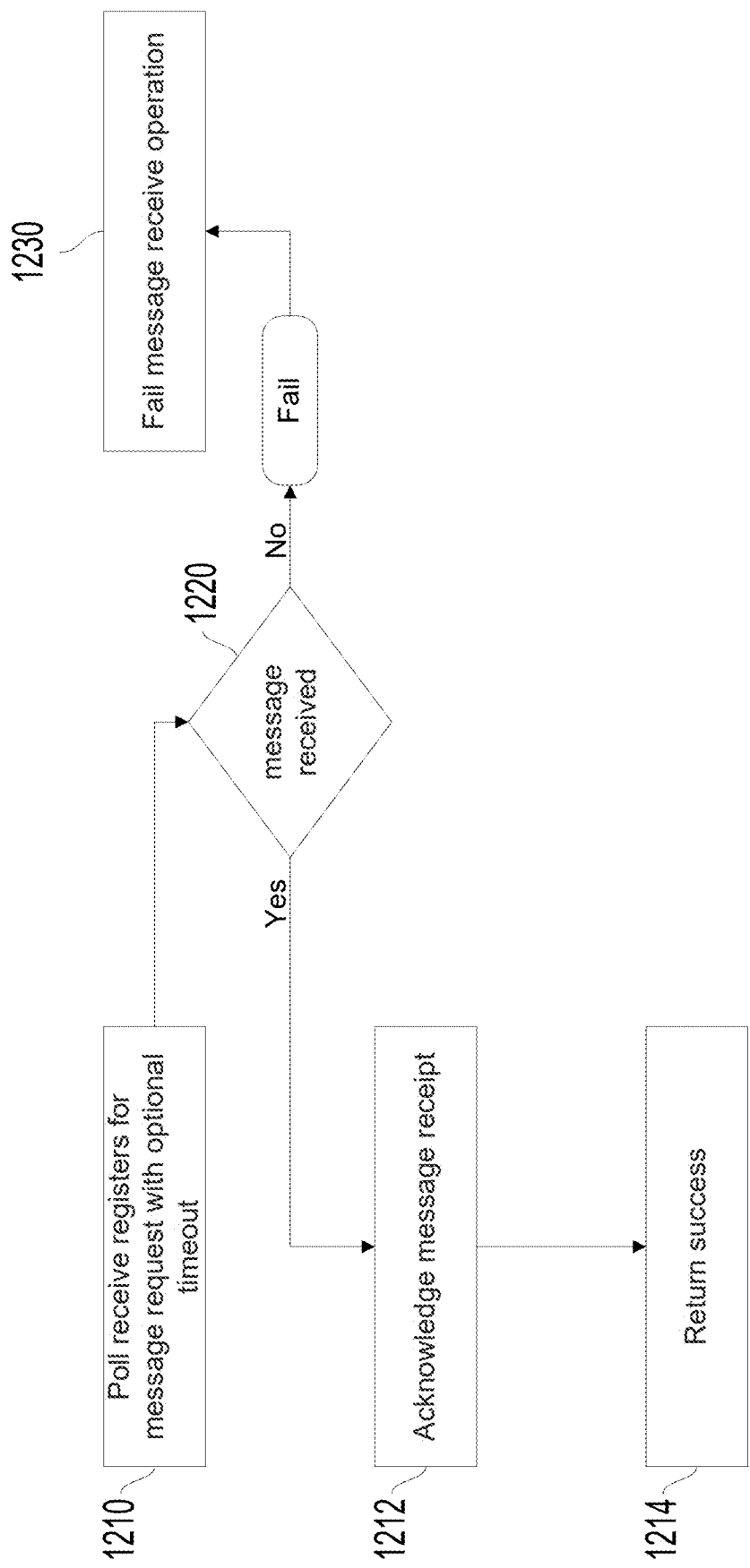
FIG. 12 is a flow chart of a host-to-host messaging process on a compute node sending a message according to an exemplary embodiment of the disclosure.

Refer now to FIG. 12. FIG. 12 is a flow chart representing a host-to-host message exchange process, wherein a first host sends a message to a second host and awaits a response from the second host. The embodiment of FIG. 12 represents the message exchange process from a point of view of the second host. First, the second host polls 1210, with an optional timeout duration, the first register for a non-zero message identification value. In some embodiments, a decision 1220 follows regarding whether a message has been received. In some embodiments, if no message is received, for example if the optional timeout duration is exceeded, the overall message send operation fails 1230. If, however, the second host identifies a pending message and validates the non-zero message identification value in the first register, the second host acknowledges the message from the first host 1212 by zeroing the first register. Finally, the message send operation concludes successfully 1214. In some embodiments, the second host may send a response message by writing the message to the sixth, seventh, and eighth registers, and writing a message response id to the fifth register. The second host then waits for a message receipt acknowledgement, signaled by the first host by zeroing the fourth register.

Figure 13:
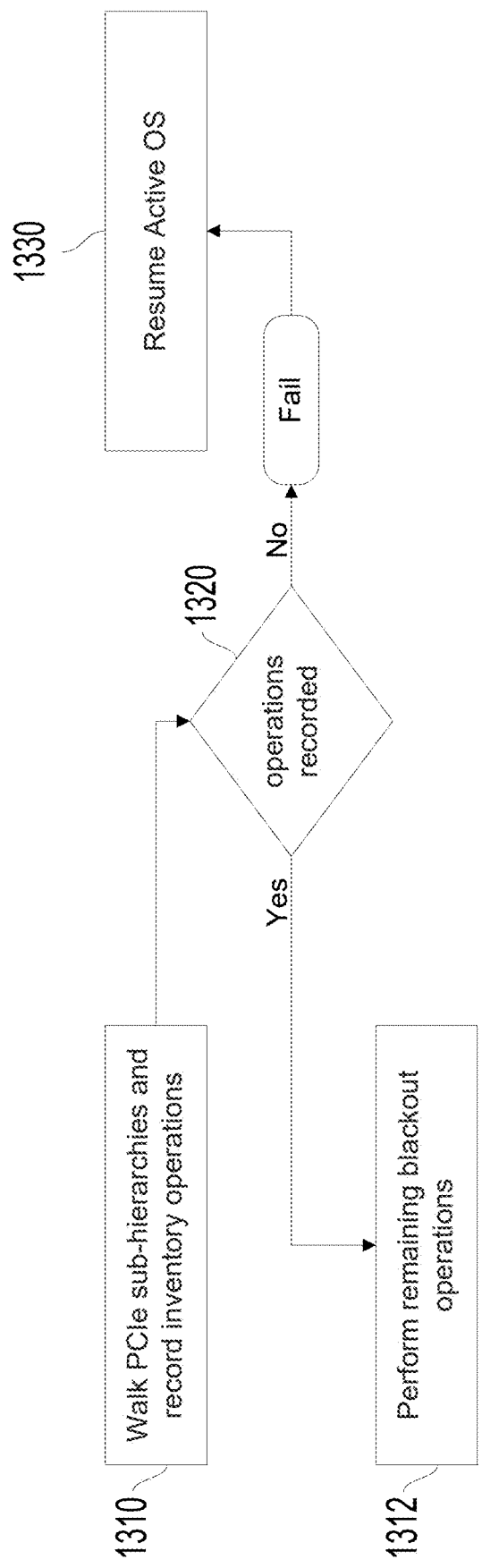
FIG. 13 is a flow chart of a PCI state collection process, part of a PCI device reprovisioning, on a failing compute node according to an exemplary embodiment of the disclosure.

Refer now to FIG. 13. FIG. 13 is a flow chart of a PCI state collection process on a failing compute node. During a Smart Exchange process, and after all devices have been quiesced, the PCI state of the failing CPU will be collected and exchanged with the standby CPU. In many embodiments, a PCI inventory collection process will traverse each available PCIe sub-hierarchies, for example a sub-hierarchy present on an IO storage domain representing a collection of attached devices, and store the relevant data for each device in the sub-hierarchy as a series of operations that will be performed on a standby CPU.

In many embodiments, this series of PCI inventory operations are included with the processor and device state that is transferred via DMA during a blackout phase of the Smart Exchange. In some embodiments, when a transfer of a processor state and a devices state is complete, the failing CPU sends an "apply" message. In various embodiments, when this message is received on the standby CPU, the standby CPU first applies the processor state and verifies the state has been applied correctly. In most embodiments, the process of applying the PCI state is then performed in two phases, a first phase and a second phase. In the first phase, inventory operations from the devices state are executed for each PCIe sub-hierarchy-skipping any operations that are performed in the final phase. In many embodiments, these operations include both PCI configuration write operations and compare operations to verify correctness.

In various embodiments, the second phase includes a re-executing of inventory operations on the standby CPU. In various embodiments, the fault tolerant operation and systems and processes disclosed herein may be performed without the requirement of a custom bios or the use of microcode. The ability to use commodity hardware without bios-level and other low level operation provides significant cost savings and replacement ease by using off the shelf hardware.

Referring to the embodiment of FIG. 13, to replicate a PCI state on a standby node, a failing compute node will first walk PCIe sub-hierarchies and record inventory operations 1310. In many embodiments, a decision 1320 follows. If the inventory operations are not recorded successfully, the failing node will resume execution of its operating system 1330. If, however, the operations are successfully recorded, the failing compute node performs remaining blackout operations 1312, including entering a VMM on all processors, transmitting any modified memory pages, and transmitting remaining information on processor and device state.

Figure 14:
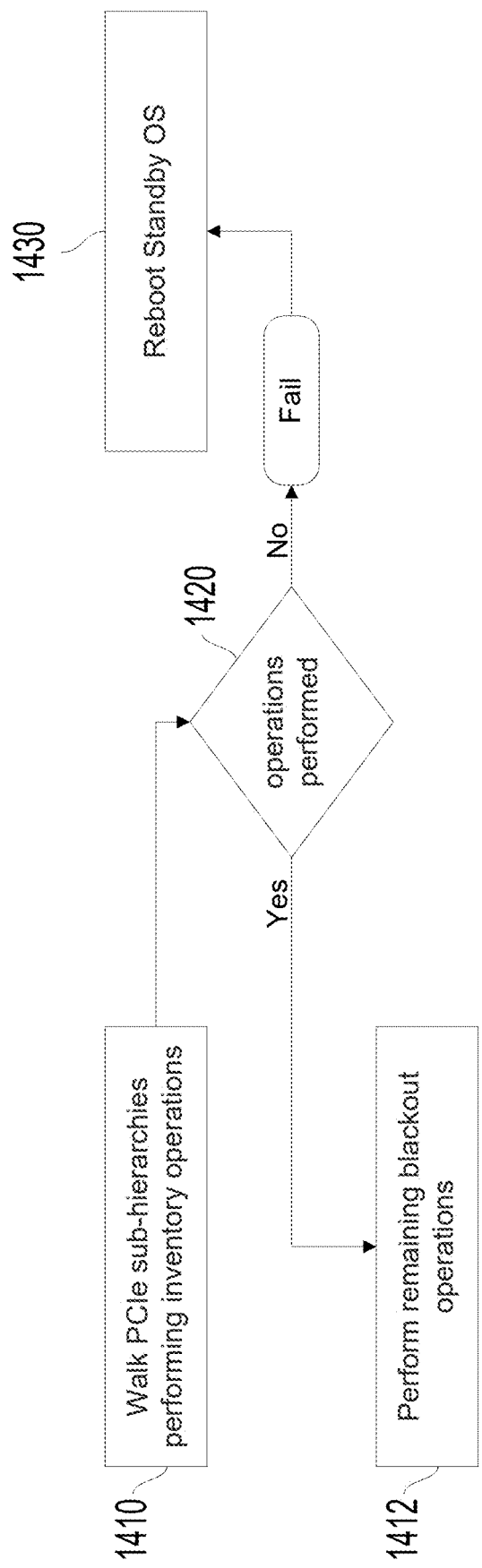
FIG. 14 is a flow chart of a PCI state application process, part of a PCI device reprovisioning, on a target compute node according to an exemplary embodiment of the disclosure.

Refer now to the embodiment of FIG. 14. FIG. 14 represents a flow chart of the PCI state collection process from a point of view of a standby compute node. To replicate a PCI device state from an active context to a passive context, a PCI state application process walks 1410 PCIe sub-hierarchies and performs inventory operations. In many embodiments, a decision 1420 follows regarding whether or not a message such as through a register updated was received. If the inventory operations do not succeed, the standby node reboots its operating system 1430. If there is an acknowledgement of the received message 1212, the state collection process is deemed successful.

Compute Node Failover

The following steps are performed by one embodiment of the disclosure to avoid system failure when there is a (CPU processor and/or memory) failure occurring or predicted. The applications executing on that failing compute node will then be transferred to the standby compute node. In some embodiments, a fault tolerant virtual machine manager (FTVMM) may be used to perform one or more steps disclosed herein.

In overview, the active compute node which is experiencing either a large number of correctable errors above a predetermined threshold or other degraded capability indicates to the MP, associated with the node's IO domain/IO subsystem, that the node has reached this degraded state, and a failover to the non-failing standby compute node should commence. The active compute node, MP and the standby compute node then engage in a communication protocol to manage the failover process and the transfer of state from the active compute node to the standby compute node. The standby compute node, which is the target location for the failover operation, is removed from its diagnostic Universal Extensible Firmware Interface (UEFI) loop and signals that it is ready to begin the process of receiving memory contents and state information from the failing active compute node. The active but failing compute node polls the standby compute node for the status of the standby compute node's start-up routines. The standby compute node enables an NTB window into its PCI-Memory Mapped IO space and begins polling for commands from the active but failing compute node.

Referring to, and at a high level, once the status from standby compute node is reported to the active but failing compute node, the active but failing compute node enables a datapath to permit a DMA memory copy from the memory of the active but failing compute node to the memory of the standby node. The standby compute node at this point cannot access any IO domain, nor can it initiate read or write access to the memory of the active but failing compute node.

The active but failing compute node signals to all its drivers which are capable of tracking changes to memory to begin tracking addresses to which DMA traffic is active (both DMA write buffers and DMA control structures).

All memory is copied from the active but failing compute node to the memory of the standby compute node, while DMA traffic continues and while the processors continue executing instructions. The register state of each device that is physically located within the failing compute node is copied to the standby node. This period of time during which memory is copied while DMA traffic is still occurring constitutes Brownout time.

The active but failing compute node tracks pages which are modified by CPU access in addition to the drivers tracking pages which are potentially modified by DMA traffic. During Brownout time, the modified pages can be re-copied while the drivers and host software continue to track newly-modified pages. This process is fully described in U.S. patent application Ser. No. 15/646,769, filed Jul. 11, 2017, the contents of which are hereby incorporated by reference in their entirety.

To understand how the blackout phase of the process operates, it is necessary to consider the operation of the fault tolerant system that includes at least two identical computers or nodes. One computer or node is the currently active or primary processor and receives requests from and provides output data to the client or user. The other computer or node is termed the standby or secondary computer or node.

Each computer or node (generally) includes a CPU a memory, a switching, and an input/output (I/O) module. In one embodiment, the two physical processor subsystems reside on the same switching fabric and communicate with each other through the switching fabric. The switching fabric controllers coordinate the transfer of data (arrows) from the currently active memory to the standby or mirror memory so that the fault tolerant system can create identical memory contents in both (currently active and standby) subsystems. The I/O modules permit the two subsystems to communicate with the outside world such as with disk storage and the network through a network interface (NI).

Although this discussion is in terms of an embodiment with two processor subsystems, more than two processor subsystems can be used in a fault tolerant computer system. In the case of multiple processor subsystems, for example a three-processor (e.g. A, B, C) fault tolerant computer system, the mirroring of the three processor subsystems is performed in two steps. First, processor subsystems A and B are mirrored, and then the resulting mirrored A, B processor subsystems are mirrored to the C processor subsystem, and so on.

During brownout and the subsequent blackout phases, memory that has been modified must be tracked and subsequently copied, when DMA traffic is halted. The problem is that the native operating system of the server may not provide a suitable interface for copying dirty pages from active memory to mirror memory, especially when a virtual machine (VM) system is used. For example, some physical processors such as the Intel Haswell and Broadwell processors (Intel Corporation, Santa Clara, CA USA) provide a set of hardware virtualization capabilities including the VMX Root operations that permit multiple virtual operating systems to share the same physical processor simultaneously with full control of many aspects of system execution. The virtual machines each have their own operating system under the control of a host hypervisor. Such systems may not provide an interface to detect and copy dirty pages for memory used by those virtual machines.

Referring to, in normal, non-mirrored, operation, the layers in the fault tolerant computer system include a hardware layer including the DMA-Capable Switch; a server firmware layer including the system UEFI BIOS; and a zero layer reserved memory region that is initialized to zero. The zero layer reserved memory is reserved by the BIOS at boot time. Although most of the memory of the fault tolerant computer system is available for use by the Operating System and software, the reserved memory is not. The size of the reserved memory region provides sufficient space for the FTVMM and a SLAT table configured with a 4-KB (4-kilobyte) page granularity and with a one-to-one mapping of all system memory. The FTVMM module causes all processors to execute their programs as guests of the FTVMM module. The Second Level Address Translation Table (SLAT) (or as also referred to by various manufacturers: Intel-Extended Page Table [EPT]; AMD-Rapid Virtualization Indexing [RVI]) in the reserved portion of memory that is used to translate memory references to physical memory. In one embodiment, a four-level SLAT Table provides a memory map with dirty bit and accessed bit settings that will identify all memory pages that are modified by the operating system kernel and other software. The four-level SLAT is sufficient to provide sufficient granularity to address each word of memory with a 4-Kbyte granularity, but other page sizes and mappings are possible.

The next layer (L1) includes the operating system and drivers for the fault tolerant computer system, including one or more modified drivers and the commonly used hypervisor host.

The last layer (L2) includes the non-virtualized server software components which are not controlled by a virtual machine control structure (VMCS) when in normal operation, such as processes, applications, and others, and it includes any Virtual Machine Guest (VM). Non-virtualized software components include an FT Management Layer. Each Virtual Machine Guest (VM) includes a VM Guest Operating System (VM OS), and a SLAT table associated with the VM (SLAT L2). Also included in each VM is one or more Virtual Machine Control Structures associated with the VM (VMCS-N), generally, one for each of the virtual processors 0-N that are allocated to that VM. Each VMCS contains a control field to enable a SLAT Table pointer (such as an Intel Extended Page Table Pointer EPTP) which provides a mapping that translates Guest Physical Addresses to system Physical Addresses.

Referring now to, at the start of mirroring, the fault tolerant computer system is operating in non-mirrored mode. The FT Management Layer causes the modified driver to begin processing a command to enter Mirrored Execution. The modified driver loads or writes the program and data code of the FT Virtual Machine Monitor (FTVMM) code, the FTVMM data, the SLAT L0, and the VMCS-L0 Array into the Reserved Memory Region.

A modified driver initializes the VMCS L0 for each processor and causes the FTVMM to be installed and to execute as a hypervisor whose program code is directly executed by every VMEXIT event (i.e. the processor mechanism that transfers execution from the Guest L2 into the hypervisor that controls the guest) that occurs in the Fault tolerant computer system. The FTVMM processes every VMEXIT and emulates the normal handling of the event that caused the VMEXIT in a manner such that the OS1, OS2, OS Commonly Used Hypervisor L1, and Guest L2 will continue their processing in a functionally normal manner as if the FTVMM were not installed and active.

At this point, the transfer of memory contents takes place under the two conditions, previously discussed: "brownout" and "blackout". Mirroring, in brownout and blackout, may take place within a few minutes after the initial fault tolerant computer system boot, once steady state operation is reached, or whenever a processor subsystem is brought back into service after a hardware error on a running fault tolerant computer system. As discussed above, during the brownout phase, the normal system workload is processed and the processor continues to make computations and to access and modify active memory. Dirty pages caused by memory writes during brownout (while copying memory to the standby computer) are tracked and are copied in the next brownout or blackout phase. The FTVMM provides a Dirty Page Bit Map to identify the modified memory pages in each phase. In Brownout phase 0, all memory is copied while tracking newly dirtied pages. In Brownout phases 1 and later, only the dirtied pages during the previous phase are copied. In Blackout, all processors but one are paused, and interrupts are disabled. In some embodiments, no system workload is processed during Blackout.

In some embodiments, the dirtied pages from the previous (brownout) phase are copied, and a final Modified Page Range List is created. The remaining dirty pages and the active processor state are then copied to the standby computer memory. Once this is complete, the modified driver generates a System Management Interrupt, and all processors execute in Firmware UEFI BIOS and Firmware SMM Module which generate an SMI, request the MPs to change the host ports on switches to the standby CPU, after which operation resumes on CPU which is now the new Online CPU, and no longer a standby CPU. The Firmware SMM performs a Resume to the modified driver, and a modified driver completes the Blackout phase, unloads the FTVMM, releases the processors that were paused, enables interrupts, and completes its handling of the request for CPU failover.

With the mirroring process completed, the FTVMM code in the reserved memory is unloaded and no longer executing. The FTVMM data, the SLAT, and the VMCS are not used, and the reserved memory is idle, waiting for the next error condition.

In more detail, during the first phase of Brownout the modified driver uses the VMCALL Functional Interface with the FTVMM to issue a command Memory Page Tracking Enable, to request the FTVMM to begin tracking all pages of modified memory in the system. The VMCALL processor instruction in the modified driver Functional Interface to the FTVMM causes each logical processor to enter the FTVMM and process the request issued by the modified driver. The FTVMM performs a function on all processors to begin using its program code in the FTVMM hypervisor context in a manner which obtains a record of all system memory pages which have been newly modified (Dirty Pages). The FTVMM searches the SLAT L0 and all SLAT L2 tables, and sets the Dirty Bits in these tables to zero, and then invalidates the cached SLAT table mappings on each processor. When all processors have completed this function in the FTVMM, the FTVMM returns control to the modified driver by performing a VMRESUME instruction. The modified driver then copies all of system memory into the Second Subsystem. The modified driver may use a DMA controller or the Switch to perform a high speed memory transfer operation that copies all system memory into the secondary or standby computer. The fault tolerant computer system continues to perform its configured workload during this processing.

Brownout Memory Copy Phase 1

As part of brownout memory copy phase 1, a modified driver obtains a dirty page bitmap and copies the newly dirtied pages of memory to the second subsystem. The modified driver uses a Functional Interface to issue a command termed Memory Page Tracking Enable on each processor. The VMCALL processor instruction in the modified driver Functional Interface to the FTVMM causes each logical processor to enter the FTVMM and process the request issued by the modified driver. The FTVMM performs a function on all processors to begin using its program code in the FTVMM hypervisor context in a manner which obtains a record of all system memory pages which have been newly modified (Dirty Pages). Then the FTVMM code on each processor searches every 8-byte Page Table Entry in the SLAT L0 table and in each guest's SLAT L2 table, and compares the Dirty Bit in each entry with the TRUE value of that bit. When the comparison result is TRUE, the FTVMM sets a bit field in a Dirty Page Bit Map, at a bit field address which represents the address of the dirty or modified page in physical memory, and then clears the Dirty Bit in the Page Table Entry. The memory mapping that is configured in the SLAT L0 has a page size of 4-Kbytes, so one bit in the Dirty Page Bit Map is set for each dirtied page found.

The memory mapping that the Hypervisor L1 configured in the SLAT L2 tables may be larger than 4-Kbytes, and the FTVMM sets a consecutive series of bit fields in the Dirty Page Bit Map, such as consecutive bit field entries for the case of a 2-Megabyte page size, when this occurs. When this process has been completed for the SLAT L0 and SLAT L2 tables, each processor performs a processor instruction to invalidate the processor's cached translations for the SLAT L0 and SLAT L2 tables (such as Intel processor instruction INVEPT), to enable the FTVMM to continue detecting new instances of dirtied pages that may be caused by the system workload.

When all processors have completed this operation in FTVMM, the FTVMM returns control to the modified driver by performing a VMRESUME instruction. The modified driver then issues another VMCALL Functional Interface command termed Request Dirty Page Bit Map. The FTVMM then provides a Dirty Page Bit Map containing a record of the recently modified pages, and stores this data in a memory buffer located in a data area of the modified driver. The modified driver then copies the set of physical memory pages that are identified in the Dirty Page Bit Map into the corresponding physical memory addresses in the secondary or standby computer. The modified driver may use a DMA controller or the Switch to perform a high speed memory transfer operation that copies the set of Dirtied Pages into the Second Subsystem.

Brownout Memory Copy Phase 2-N/Repetition

The procedure MEMORY COPY PHASE 1 may be repeated one or more times in order to obtain a smaller resulting set of Dirtied Pages that may be generated by the system workload during the final Brownout Memory Copy Phase N. For example, in one embodiment the modified driver may repeat the same sequence to obtain another dirty page bitmap and copy the newly dirties pages to the second subsystem one or more times.

After the Brownout copy phase is complete, the active but failing CPU signals its drivers, which are tracking DMA memory access, to pause all DMA traffic. This is the beginning of the Blackout phase. CPU threads are then all paused to prevent further modification of memory pages. At this time, the final list of pages modified by either CPU access or DMA access is copied to the standby CPU.

In more detail during blackout, the modified driver executes driver code on all processors on the active but failing CPU concurrently and copies the final set of dirtied pages to the standby CPU. The modified driver causes all processors on CPU to disable system interrupt processing on each processor so as to prevent other programs in the Fault tolerant computer system from generating more Dirty Page Bits. The modified driver uses the VMCALL Functional Interface to issue a command, Blackout Page Tracking Enable, which causes the FTVMM to identify the set of recently dirtied memory pages and also causes the FTVMM to identify certain volatile or frequently modified memory pages such as the VMCS-N and SLAT L2, and include those pages in the set of dirtied pages. The FTVMM may temporarily pause all processors except processor #0 in the FTVMM. The modified driver then issues another VMCALL Functional Interface command, Request Dirty Page Bit Map, to obtain the bit map of dirty pages. The FTVMM then provides a Dirty Page Bit Map containing a record of the recently modified pages, and stores this data in a memory buffer located in a data area of the modified driver. In various embodiments, references to CPU may also refer to a compute node, In one embodiment, the modified driver then copies the set of physical memory pages that are identified in the Dirty Page Bit Map into the corresponding physical memory addresses in the Second Subsystem. The modified driver then creates a list of memory ranges that are assumed to be dirty or modified, including a memory range for the Reserved Memory Region, and stores this information in a data structure termed the Final Blackout Memory Range List. This procedure is termed BLACKOUT MEMORY COPY because the system workload does not execute, and the workload experiences a short server processing outage while the final set of Dirtied Pages is being copied into the standby CPU.

Once all the memory of the active but failing compute node has been copied, the active but failing compute node saves the internal state of its processors (including its registers, local Advanced Programmable Interrupt Controller, High Precision Event Timer, etc.) to a memory location, copies that data to the standby compute node, where it is subsequently restored into the corresponding registers of the standby compute node. A Server Management Interrupt (SMI) return stack is created on the standby compute node for the final set of registers (program counters, etc.) which need to be restored on the standby compute node to resume processing from the exact point where the active but failing compute node left off.

The active but failing compute node sets flags in its own NTB window into the PCI-Memory Mapped IO (PCI-MMIO) space and in the NTB window of the standby compute node so that each compute node 14, has its own intended new state after the failover operation. At any time prior to the completion of this step, the failover can be aborted, and operation simply continues on the original active but still failing compute node.

To complete the failover, once all steps up to this point have been completed successfully, the active but failing CPU sends a command to the Primary Management Processor (which will coordinate with the Secondary Management Processors and handle any error cases in this step) to swap all of the resource mapping between the host ports for the two compute nodes which are participating in the failover operation. Each management processor will then make a series of firmware API calls to its local switch to accomplish the resource mapping changes. The Primary Management Processor then signals to the two compute nodes when the switch reconfiguration is complete.

Both compute nodes, read the token from their mailbox mechanism or other communication channel showing their new respective states (swapped from the original active and standby designations). Software on the new Active compute node then performs any final cleanup as required. For example, it may be necessary to replay PCI enumeration cycles in order to train the switching fabric to map transactions from the new Active compute node and perform a Resume from System Management (RSM) instruction to return control to the operating system and resume the interrupted instruction. The standby compute node can reactivate the previously quiesced devices and allow transactions to flow through the fabric to and from the standby compute node.

In addition to the CPU/memory failover capability just discussed, the disclosure is also capable of transferring the active IO domain/IO subsystem, for example $IO_1$, to the other or standby IO domain, for example $IO_2$.

Unless specifically stated otherwise as apparent from the following discussion, it is appreciated that throughout the description, discussions utilizing terms such as "processing" or "computing" or "calculating" or "delaying" or "comparing", "generating" or "determining" or "forwarding" or "deferring" "committing" or "interrupting" or "handling" or "receiving" or "buffering" or "allocating" or "displaying" or "flagging" or Boolean logic or other set related operations or the like, refer to the action and processes of a computer system, or electronic device, that manipulates and transforms data represented as physical (electronic) quantities within the computer system's or electronic devices' registers and memories into other data similarly represented as physical quantities within electronic memories or registers or other such information storage, transmission or display devices.

The algorithms presented herein are not inherently related to any particular computer or other apparatus. Various general purpose systems may be used with programs in accordance with the teachings herein, or it may prove convenient to construct more specialized apparatus to perform the required method steps. The required structure for a variety of these systems is apparent from the description above. In addition, the present disclosure is not described with reference to any particular programming language, and various embodiments may thus be implemented using a variety of programming languages.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation. Further, the various compute nodes, PCIe devices, PCIe switches, memory complex, random access memory, non-volatile FLASH memory, persistent memory, memory devices, accelerators, RAS (Reliability, Availability and Serviceability) systems, methods, software and hardware for memory protection and error correction, backplanes, midplanes, interconnects, data paths, I/O devices, caches, management CPUs, bridges, buses, network devices, interfaces, NVMe devices, disks, and parts of the foregoing disclosed herein can be used and shared with each other in various combinations and any other devices and systems without limitation.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The examples presented herein are intended to illustrate potential and specific implementations of the present disclosure. The examples are intended primarily for purposes of illustration of the disclosure for those skilled in the art. No particular aspect or aspects of the examples are necessarily intended to limit the scope of the present disclosure.

The figures and descriptions of the present disclosure have been simplified to illustrate elements that are relevant for a clear understanding of the present disclosure, while eliminating, for purposes of clarity, other elements. Those of ordinary skill in the art may recognize, however, that these sorts of focused discussions would not facilitate a better understanding of the present disclosure, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present disclosure, a single component may be replaced by multiple components, and multiple components may be replaced by a single component, to perform a given function or functions. Except where such substitution would not be operative to practice embodiments of the present disclosure, such substitution is within the scope of the present disclosure. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present disclosure. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present disclosure based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity.

Unless otherwise indicated, all numbers expressing lengths, widths, depths, or other dimensions and so forth used in the specification and claims are to be understood in all instances as indicating both the exact values as shown and as being modified by the term "about." As used herein, the term "about" refers to a ±10% variation from the nominal value. Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques. Any specific value may vary by 20%.

The invention may be embodied in other specific forms without departing from the spirit or essential characteristics thereof. The foregoing embodiments are therefore to be considered in all respects illustrative rather than limiting on the disclosure described herein. Scope of the invention is thus indicated by the appended claims rather than by the foregoing description, and all changes which come within the meaning and range of equivalency of the claims are intended to be embraced therein.

It will be appreciated by those skilled in the art that various modifications and changes may be made without departing from the scope of the described technology. Such modifications and changes are intended to fall within the scope of the embodiments that are described. It will also be appreciated by those of skill in the art that features included in one embodiment are interchangeable with other embodiments; and that one or more features from a depicted embodiment can be included with other depicted embodiments in any combination. For example, any of the various components described herein and/or depicted in the figures may be combined, interchanged, or excluded from other embodiments.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within +20% of a target value in some embodiments, within +10% of a target value in some embodiments, within +5% of a target value in some embodiments, and yet within +2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

The use of headings and sections in the application is not meant to limit the disclosure; each section can apply to any aspect, embodiment, or feature of the disclosure. Only those claims which use the words "means for" are intended to be interpreted under 35 USC 112, sixth paragraph. Absent a recital of "means for" in the claims, such claims should not be construed under 35 USC 112. Limitations from the specification are not intended to be read into any claims, unless such limitations are expressly included in the claims.

Embodiments disclosed herein may be embodied as a system, method or computer program product. Accordingly, embodiments may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, embodiments may take the form of a computer program product embodied in one or more computer readable medium(s) having computer readable program code embodied thereon.

What is claimed is:

1. A fault tolerant system comprising:
a first computer system comprising a first processor, a first memory, and a first operating system configured to run on the first processor, the first operating system comprising a first platform driver;
a first IO storage subsystem comprising a first N-lane switch configured for one or more first storage devices;
a first IO non-storage subsystem comprising a first M-lane switch configured for one or more first non-storage devices, wherein M and N are whole numbers greater than or equal to 2;
a second computer system comprising a second processor, a second memory, and a second operating system configured to run on the second processor, the second operating system comprising a second platform driver;
a second storage IO subsystem comprising a second N-lane switch configured for one or more second storage devices;
a second IO non-storage subsystem comprising a second M-lane switch configured for one or more second non-storage devices;
wherein the first platform driver and the second platform driver are each configured to establish a communication channel between the first computer system and the second computer system,
wherein the first computer system and the second computer system are both in electrical communication with the first IO storage subsystem, the first IO non-storage subsystem, the second storage IO subsystem, and the second IO non-storage subsystem,
wherein one or more of the N-lane or M-lane switches of each computer system comprises a set of registers, wherein each computer system is configured to modify at least one register of the set of registers to communicate information to the other computer system; and
a midplane comprising a power connector, a processor side and an IO side, wherein the processor side comprises one or more connectors in electrical communication with the first computer system and the second computer system,
wherein the IO side comprises a plurality of connectors in electrical communication with the first IO storage subsystem, the first IO non-storage subsystem, the second storage IO subsystem, and the second IO non-storage subsystem.

2. The system of claim 1, wherein each N-lane switch and M-lane switch are unmanaged such that no processor in electrical communication with the midplane is managing any of the N-lane switches and the M-lane switches.

3. The system of claim 1, wherein each platform driver is a kernel mode driver.

4. The system of claim 1, wherein the information communicated by modifying registers includes messages for migrate operations, apply operations, and commit operations transmitted from the first computer system and acknowledgements of migrate operations, apply operations, and commit operations by the second computer system.

5. The system of claim 1, wherein each computer system switch comprises modified switch firmware.

6. The system of claim 5, wherein the modified switch firmware is configured to, in response to an indication that the first computer system is failing or about to fail, reprovision a group of devices in communication with the first computer system such that the group of devices becomes attached to and in communication with the second computer system.

7. The system of claim 3, where the first computer system comprises a switch, wherein the switch is connected to the midplane, wherein the switch comprises modified switch firmware, the modified switch firmware to generate a first synthetic device comprising a first set of registers.

8. The system of claim 7, wherein each platform driver is configured to write information to or read information from the first set of registers or a second set of registers of a second synthetic device, wherein the second synthetic device is connected to the second computer system.

9. The system of claim 1, wherein a first set of registers are written by the first computer system and read using a second set of registers that are paired with first set of registers to provide a communication channel between the first computer system and the second computer system.

10. The system of claim 1, wherein each M-lane switch and N-lane switch is a PCIe switch, wherein the first computer system comprises a first DMA engine and the second computer system comprises a second DMA engine.

11. A method of exchanging information between an active compute node and a standby compute node of a fault tolerant system, the method comprising:
modifying a first bios of a first compute node and a second bios of a second compute node such that one or more parameters of the first compute node and the second compute node are synchronized;
establishing a DMA datapath between the first compute node and the second compute node;
establishing a host-to-host messaging datapath;
generating a migration request in response to the first compute node identifying a failure mode, wherein the first compute node is an active compute node;
querying a second compute node to assess standby compatibility, wherein the second compute node is a standby compute node;
establishing a PCI inventory on the first compute node;
establishing a plurality of operations that will be performed on the second compute node to bring the PCI inventory establish on the first compute node into service on the second compute node; and
transferring processor state information and memory data from a first computer system to a second computer system through the DMA datapath.

12. The method of claim 11 further comprising:
confirming that a migration of data from the first compute node to the second compute node is acknowledged through the host-to-host messaging datapath; and
quiescing local devices connected to the first compute node and quiescing processor threads in the first compute node that are unrelated to the migration of data from the first compute node to the second compute node.

13. The method of claim 12 further comprising:
applying processor state information and memory data to the second compute node; and
re-provisioning devices from the first compute node to the second compute node.

14. The method of claim 13 further comprising:
verifying presence of re-provisioned devices in IO domain of second computer system; and
changing role of the second compute node to active.

15. The method of claim 13, wherein the re-provisioning step is performed at least in part using modified switch firmware of a second switch, wherein the second compute node comprises the second switch.

16. A fault tolerant system comprising:
a first computer system comprising a first processor, a first bios, and a first memory;
a first IO subsystem comprising a first N-lane switch configured for one or more first devices, wherein the first N-lane switch comprises a set of registers;
a second computer system comprising a second processor, a second bios, and a second memory;
a second IO subsystem comprising a second N-lane switch configured for one or more second devices, wherein the second N-lane switch comprises a set of registers, wherein each computer system is configured to modify at least one register of the set of registers to communicate information to the other computer system; and
an IO side device, wherein the IO side device comprises a plurality of connectors in electrical communication with the first IO subsystem and the second IO subsystem, wherein the first bios and the second bios are modified such that one or more parameters of the first computer system and the second computer system are synchronized.

* * * * *